United States Patent [19]

Pastor

[11] Patent Number: 5,164,996
[45] Date of Patent: Nov. 17, 1992

[54] OPTICAL CHARACTER RECOGNITION BY DETECTING GEO FEATURES

[76] Inventor: Jose Pastor, 191 Wilton Rd., Westport, Conn. 06880

[21] Appl. No.: 848,521

[22] Filed: Apr. 7, 1986

[51] Int. Cl.$^5$ ............................................. G06K 9/46
[52] U.S. Cl. ...................................... 382/25; 382/55; 382/9
[58] Field of Search ................... 382/25, 26, 9, 21, 55

[56] References Cited

U.S. PATENT DOCUMENTS

| | | | |
|---|---|---|---|
| 3,609,685 | 9/1971 | Deutsch | 382/21 |
| 3,639,903 | 2/1972 | Nashljunas et al. | 382/25 |
| 3,860,909 | 1/1975 | Demonte | 382/25 |
| 3,890,596 | 6/1975 | Beun et al. | 382/26 |
| 3,934,225 | 1/1976 | de Possel | 382/26 |
| 4,045,773 | 8/1977 | Kadota et al. | 382/9 |
| 4,193,056 | 3/1980 | Marita et al. | 340/146.3 AC |
| 4,610,025 | 9/1986 | Blum et al. | 382/9 |
| 4,628,532 | 12/1986 | Stone et al. | 382/25 |
| 4,654,873 | 3/1987 | Fujisawa et al. | 382/9 |

FOREIGN PATENT DOCUMENTS 1255654 12/1971 United Kingdom .................. 382/26

OTHER PUBLICATIONS

M. Beun, "A flexible method for automatic reading of handwritten numerals", Philips Technical Review, 1973, vol. 33, No. 4, pp. 89-101.
Patent Abstracts of Japan vol. 9 No. 262 (P-398) (1985) Oct. 19, 1985.
Patent Abstracts of Japan vol. 9 No. 323 (P-414) (2046) Dec. 18, 1985.
"The Recognition of Handwritten Numerals by Contour Analysis", IBM J. Res. Dev., vol. 7, pp. 14-21, Jan. 1963, Greanias et al.
"Recognition of Printed Telugu Characters", Rajasekaran et al., Computer Graphics and Image Processing, vol. 6, pp. 335-360, 1977.
"High Speed Pattern Recognition System for Alphanumeric Hand-printed Characters", 1982 IEEE, D'Amato et al., pp. 165-170.

Primary Examiner—Leo H. Boudreau
Attorney, Agent, or Firm—Robert Whisker; Melvin J. Scolnick; David E. Pitchenik

[57] ABSTRACT

An alphanumeric character is recognized by optically scanning that character, detecting the occurrence of predetermined geographical features in the scanned image, comparing the detected geographical features to a store of particular geographical features which identify respective alphanumeric characters, and identifying the scanned image as the alphanumeric character having those geographical features to which the detected geographical features favorably compare. The aforementioned geographical features comprise lagoons (formed as enclosed areas) and bays (formed as open areas). The types of bays and lagoons, as well as the relative positioning of such bays and lagoons with respect to each other, characterize the respective alphanumeric characters. By detecting the bays and lagoons and relative positions thereof in the scanned image, the identity of that image is ascertained.

56 Claims, 12 Drawing Sheets

FROM IMAGE PICK-UP 10

FROM IMAGE THINNING CONTROL 12

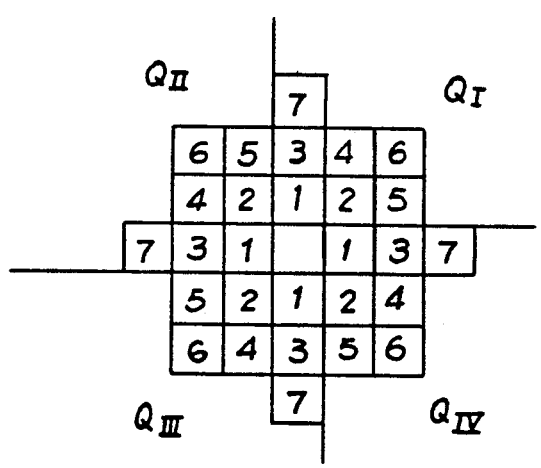
FIG. 6A    FIG. 6B
FIG. 9A
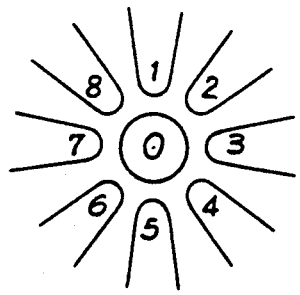
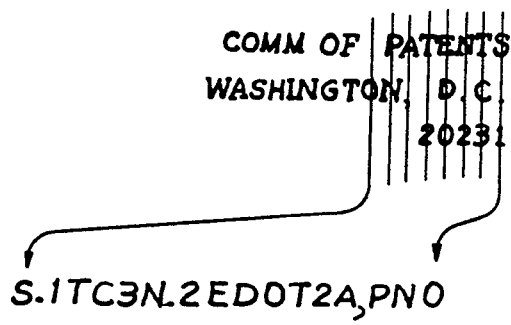
FIG. 7    FIG. 9B
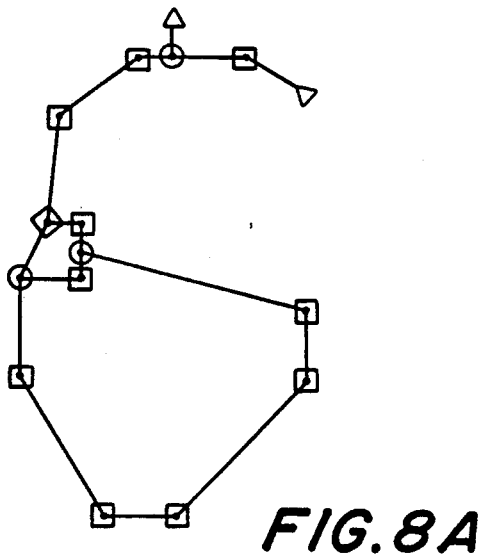
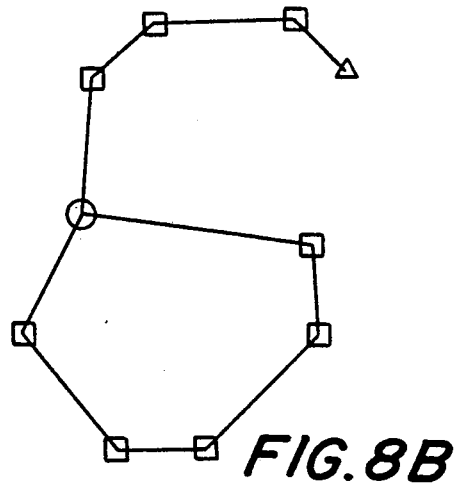
FIG. 8A    FIG. 8B

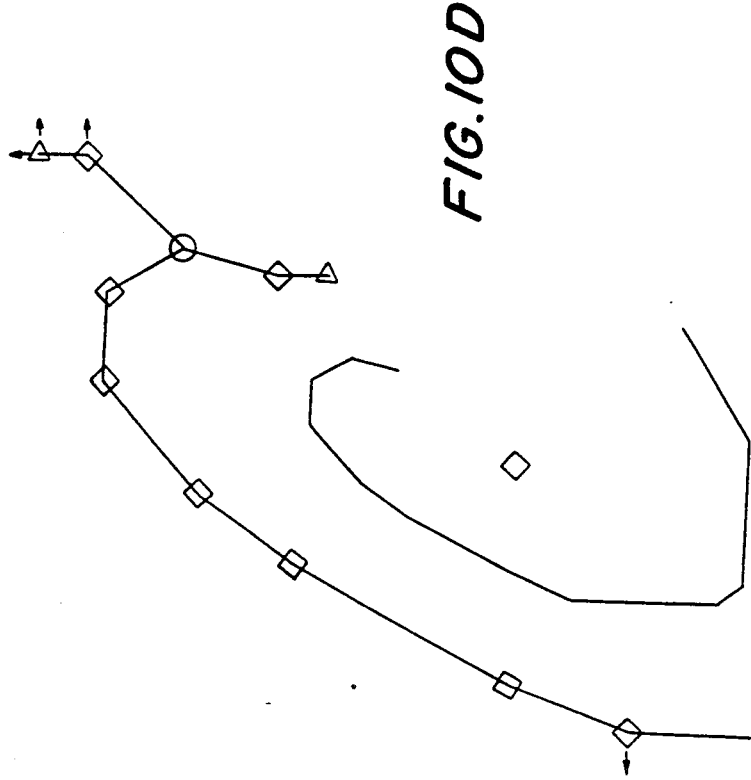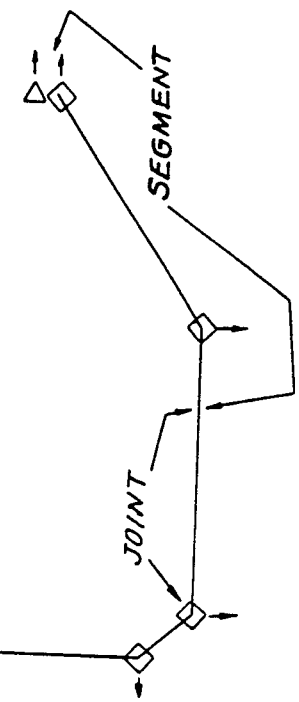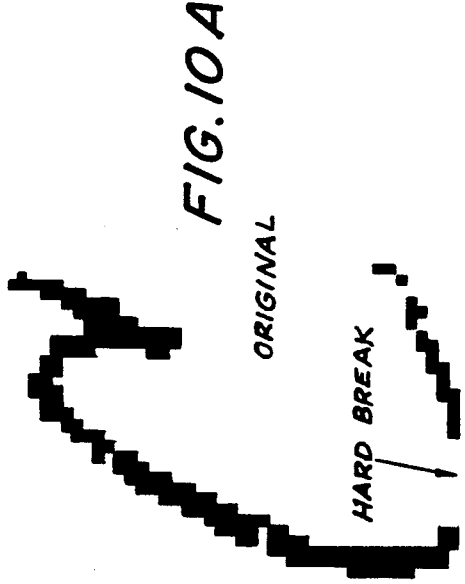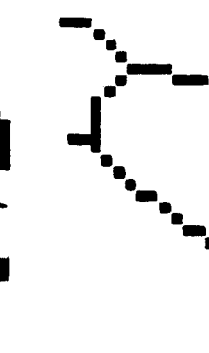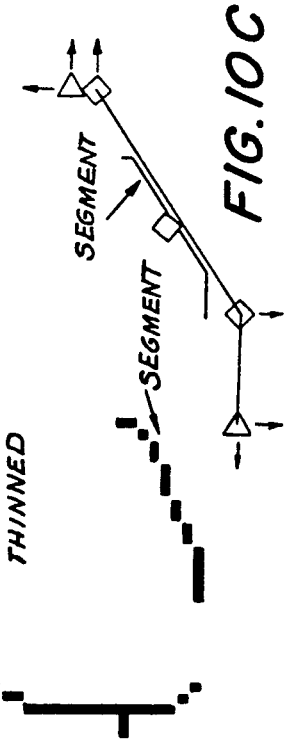
FIG.10A ORIGINAL HARD BREAK
FIG.10B THINNED
FIG.10C SEGMENT
FIG.10D SEGMENT JOINT

FIG.11A
BASIC CHARACTER: L/BS
BNE + L/BS + BNW 
FIG.11B
FIG.11C
BNE+L/BS+BNW/BW

OPTICAL CHARACTER RECOGNITION BY DETECTING GEO FEATURES

BACKGROUND OF THE INVENTION

This invention relates to optical character recognition and, more particularly, to a technique by which an alphanumeric character is recognized by the geographical features (e.g. bays and lagoons) which comprise that character.

Optical character recognition (OCR) devices have long been used to sense and interpret alphanumeric characters that, typically, are provided on a printed page. Usually, however, such devices are limited to the extent that characters are recognizable only if they are printed in one (or, at best, a limited few) predetermined font. Printed characters which, nevertheless, may be clear and formed uniformly as, for example, by a typewriter or other printing machine, will not be recognized if they are formed in some other font.

Another operating limitation of conventional optical character recognition devices relates to what is known as "line finding" and "segmentation". A line finding operation is carried out by many conventional OCR devices to locate the lines of characters that are printed on a page. This distinguishes character lines from the spaces between lines and usually is implemented by detecting the distribution of pixel information in the horizontal direction. A greater concentration of black pixels represents a line of characters and a low concentration represents a space between lines.

A segmentation operation is intended to locate the spacing between characters in a line of characters. This isolates a block of pixel data, which then is presumed to be limited solely to a character to be identified, whereafter the data block is examined and recognized. Typical segmentation operations are successful if the characters in a line are spaced uniformly and are printed in, for example, Roman-type font Characters that are printed at angles, such as italics, often cannot be isolated. Rather, the segmentation operation senses portions of adjacent characters, presumes that such portions comprise a single character, and then attempts, unsuccessfully to identify a "character" formed of such portions Similarly, typical segmentation operations often cannot separate (or "segment") characters that are smudged or blurred because of the lack of a well-defined space between such characters. Thus, a block of data representing a character to be identified cannot be formed. Likewise, a "break" that might be present in a character may be interpreted erroneously as a space between adjacent characters, resulting in two separate blocks representing partial characters rather than a single block representing a whole (albeit broken) character.

It is believed that the aforementioned disadvantages of conventional optical character recognition devices are attributed primarily to the fact that, in most such devices, character segmentation (or separation) might not be successful, thus impeding the comparison of a properly scanned character to a reference, or standard geometric form of that character. Significant deviations between the scanned and reference characters, such as differences in font, misalignment of the scanned character, apparent "connections" between independent characters, or "breaks" in a single character, largely due to improper character segmentation, prevent accurate identification. While various comparison techniques have been proposed heretofore, most optical character recognition methods rely upon a "template" comparison of scanned characters in order to identify those characters.

OBJECTS OF THE INVENTION

Therefore, it is an object of the present invention to provide an improved technique of optically recognizing alphanumeric characters which avoids the aforementioned disadvantages attendant conventional optical character recognition (OCR) devices.

Another object of this invention is to provide an OCR technique which does not rely upon the typical geometrical "template" comparison of a scanned character with known reference characters.

A further object of this invention is to provide an OCR technique which is capable of recognizing multiple fonts, and even recognizing handprinted characters.

An additional object of this invention is to provide an OCR technique in which plural lines of characters may be scanned at one time by a single scanning device, thus obviating the requirement heretofore of line-by-line segmentation.

A still further object of this invention is to provide an OCR technique which eliminates the prior art segmentation operation but which, nevertheless, effectively isolates and identifies characters notwithstanding the font of those characters or their relative "closeness".

Yet another object of this invention is to provide an improved OCR technique in which particular geographical features which comprise alphanumeric characters are detected; and the character is identified as a function of the type and relative position of those geographical features.

Yet a further object of this invention is to provide an improved OCR technique which detects critical points in a character to be recognized, classifies the types of points which are detected, and limits the set of characters in which the character to be identified is included in accordance with the sensed points.

Another object of this invention is to provide an OCR technique which is capable of identifying a character, notwithstanding "breaks" which may be sensed in the lines (or strokes) which form that character.

An additional object of this invention is to provide an OCR technique which recognizes both "soft broken" characters and "hard broken" characters, as those expressions are defined herein.

A still further object of this invention is to provide an OCR technique in which connections, or links between two independent characters are sensed and recognized, and such connections then are ignored to permit proper identification of those two characters.

Various other objects, advantages and features of the present invention will become readily apparent from the ensuing detailed description, and the novel features will be particularly pointed out in the appended claims.

SUMMARY OF THE INVENTION

In accordance with this invention, an OCR technique is provided in which at least one character is scanned, predetermined geographical features in the scanned character are detected, and the detected geographical features are compared to a store of particular geographical features of which known alphanumeric characters are comprised, the scanned character being identified as the alphanumeric character having geographical features which compare favorably to the detected geographical features. The relative positions of the detected geographical features with respect to each other is a primary factor in identifying the scanned character.

As one aspect of this invention, the detected geographical features are lagoons, which are formed as enclosed areas, and bays, which are formed as open areas. The types and relative positions of the bays, as well as the relative positions of those bays to detected lagoons, determine the identity of the scanned character.

As another aspect of this invention, the number of "class 1" and "class 3" points included in the scanned area are detected. As used herein, a "class 1" point is defined as the free end of a link (a link is a portion of a line included in the character), and a "class 3" point is defined as a point formed by the juncture of three links. (Also considered are "class 4" points which are defined as points formed by the juncture of four links; and one "class 4" point is equivalent herein to two "class 3" points.) The number of "class 1" and "class 3" points included in the scanned character significantly narrows the set of characters in which the scanned character is included The geographical features of the scanned character then are compared to the geographical features of the characters in that set. Since geographical features are detected and analyzed, the particular font of which the character is formed is not significant. This is because a given character includes certain minimum geographical features irrespective of its font.

As a feature of this invention, pixels are generated as a character is scanned, and the coordinates of each generated pixel (for example, the XY coordinates) are stored. Preferably, only the XY coordinate at the start of a link and the XY coordinate at its end are stored; and, advantageously, these XY coordinates are determined and stored in real time (that is, as the character is scanned). Depending upon the number of links connected to a particular XY coordinate, the class of the point defined by that XY coordinate is established The presence of lagoons and bays is ascertained by tracing paths, in predetermined directions, from one connected link to the next, that is, from one stored XY coordinate at the beginning of a link to the next stored XY coordinate which, in most cases, is the end point of one link and the beginning point of a connected link. A lagoon is sensed when the traced path returns to a particular XY coordinate included therein; and a bay is ascertained as a function of changes in the X and Y directions as a path is traced.

In accordance with yet another aspect of this invention, a so-called "soft" break in a scanned character is detected by sensing the distance between two or more filled pixels separated by one or two blank pixels. A sensed "soft" break is completed by filling in the blank pixel (or pixels), whereafter the aforementioned classification of critical points (that is, the detection of "class 1" and "class 3" points) and geographical feature analysis are carried out.

As yet another aspect of this invention, a connection between two independent characters, if present, is sensed and disregarded. That portion of the detected geographical features which corresponds to a known alphanumeric character is ascertained, and that portion of the scanned character which follows (i.e. the connected portion) is disregarded. Thus, the connection between known alphanumeric characters is, essentially, removed from the scanned arrangement.

As a further aspect of this invention, a so-called "hard" break in a character is detected A hard break differs from a soft break in that three or more blank pixels separate two filled pixels When a hard break is detected, the confines of a "block" of image data are established, and the character within that block is analyzed as aforesaid. Whereas the dimensions of blocks of unbroken characters on a page will lie generally within the same ranges, the dimensions of a block containing only a portion of a character (formed by a hard break) will lie outside this range. If, for example, two out-of-range blocks are proximate each other, such blocks are connected and the resultant block is analyzed to detect "class 1" and "class 3" points as well as the geofeatures included therein. Hence, hard breaks may be joined and the hard-broken character identified.

BRIEF DESCRIPTION OF THE DRAWINGS

The following detailed description, given by way of example and not intended to limit the present invention solely to the particular embodiments shown and described herein, will best be understood in conjunction with the accompanying drawings in which:

FIGS. 6A and 6B are matrices which are useful in connecting or extending links in a "soft" broken character;

FIG. 7 is a diagrammatic representation of the decimal notations used to designate each geographical feature;

FIGS. 8A and 8B represent the manner in which distortions in a scanned alphanumeric character are minimized;

FIGS. 9A and 9B are useful in understanding the manner in which the present invention identifies alphanumeric characters which are present in multiple lines;

FIGS. 10A–10D are useful in understanding how a "hard" break in a character ("C") is detected and filled to permit proper identification of the hard-broken character;

FIGS. 11A–11D represent the font insensitivity of the present invention and, as an example, different configurations of a character ("A") having a basic geofeature construction are, nevertheless, identified;

DETAILED DESCRIPTION OF A PREFERRED EMBODIMENT

Figure 1:
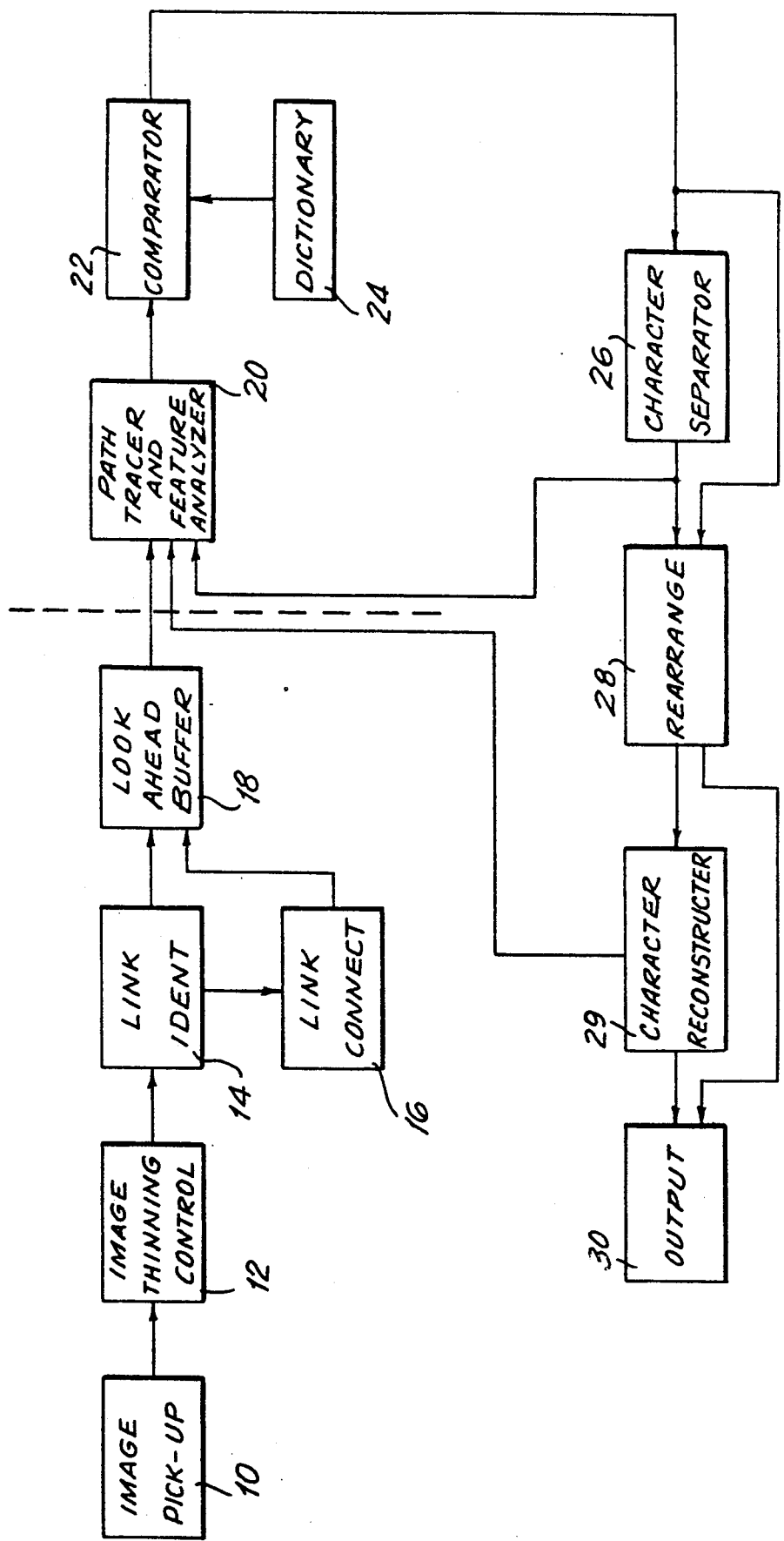
FIG. 1 is a functional block diagram of a preferred embodiment of the present invention, which, preferably, is implemented by the combination of circuitry, or "hardware", together with a suitably programmed micro- or mini-computer (i.e. "software")

Referring first to FIG. 1, there is illustrated a functional block diagram of a preferred embodiment of the present invention. As mentioned above, this block diagram may be implemented by a combination of "hardware" and "software", that is, a suitably programmed microcomputer or minicomputer may be used to carry out this invention. The elements comprising the system illustrated in FIG. 1 include an optical image pick-up device 10, an image thinning control 12, a link identifier 14, a look-ahead buffer 18, a path tracer and geographical feature analyzer 20, a feature comparator 22, a character separator 26, a character re-arranger 28, a character reconstructor 29 and an output 30. Optical image pick-up device 10 may comprise a conventional optical scanner and, preferably, comprises a single column of optical image sensors disposed in a linear array. This array may be as long as desired, but should be within the practical limitations of size, the size of a buffer, the size of a memory and the frequency at which scanning is carried out, as will become apparent from the ensuing description. In one embodiment, the array was long enough to extend across at least three lines of typewritten characters. As a numerical example, the linear array may be a CCD array comprised of 1,024 pixels. Alternatively, optical image pick-up device 10 may be formed as an n×m array of conventional sensors, such as CCD devices. The purpose of device 10 is to sense the presence of visually perceptible information on a page and to generate signals representing the sensed information. Typically, device 10 includes not only the CCD pick-up elements, but also quantization and binarization means to distinguish between "black" and "white" contrasts formed between black characters printed on a white page, as sensed by the pick-up sensors. Of course, other character/background contrasts may be used; and it is expected that optical image pick-up device 10 is capable of detecting such contrasts to generate appropriate image-representing signals.

The image signals generated by device 10 are coupled to image thinning control 12 by a conventional preprocessor (not shown) which fills in small "holes" in the binarized image and removes small spurious marks therefrom. Control 12 is described in detail in U.S. Pat. Nos. 4,539,704, issued Sep. 3, 1985 and 4,574,357, issued Mar. 4, 1986, both assigned to the assignee of the present invention; and is adapted to convert a relatively thick image produced by device 10 to a relatively thin image. More particularly, image thinning control 12 functions to reduce the thickness of the scanned image to the thickness of a single pixel. That is, the apparent strokes which form the character exhibit a thickness of one pixel. This image thinning operation is best appreciated from FIG. 1A, wherein the character "S" is detected by image pick-up device 10 and produced (in binary form) as the illustrated image; and image thinning control 12 serves to "thin" that image to the form shown in FIG. 1B. For simplification, extraneous elements normally included in the thinned image are not illustrated in FIG. 1B. It is seen that the image thinning operation serves to produce an image formed of links that are merely one pixel wide.

The thinned, binary image produced by image thinning control 12 (FIG. 1B) is supplied to link identifier 14, which operates in the manner described in greater detail below to detect and identify the respective links which constitute a sensed character. Essentially, the pixels which constitute a picked up binary image are analyzed; and the beginning and ending points of each link are identified and stored. Advantageously, these points are stored as XY coordinates for the subsequent purpose of determining the number and type of critical points included in the sensed image, and for the additional purpose of analyzing the geographical features of that image. As will be explained, link identifier 14 functions as the document is scanned. It will be appreciated that, during such scanning, a particular pixel might be identified initially as being included in a particular link. However, on further scanning, it may turn out that such pixel actually is included in a different link. To allow for such subsequent determinations, look-ahead buffer 18 is coupled to link identifier 14 and serves to store therein the initial and, if necessary, the changed identification of the link in which a pixel is included.

A link connector 16 also is coupled to link identifier 14 and, as will be described in conjunction with the matrices shown in FIGS. 6A and 6B, determines if a "blank" pixel should, in fact, be "filled in" and connected to an existing link. Preliminary determinations as to the particular link in which a "filled in" pixel is included are supplied by link connector 16 to look-ahead buffer 18. Of course, and as will be explained, as scanning continues, such preliminary determinations may be altered as additional pixels are detected.

Look-ahead buffer 18 preferably has a capacity to store the XY coordinates of beginning and ending points of links that are included in, for example, seven successive scan columns It has been found that preliminary determinations regarding the particular link in which a pixel is included will be corrected, if necessary, after seven columns (three preceding columns, the column in which a pixel subject to preliminary determination is present, and then three succeeding columns) are scanned.

The scanning of a "block" of data which, in many instances, is a block representing a character to be identified, is ended when all connected links end in a pixel that is spaced from the next closest pixel (e.g. the beginning pixel of an adjacent character) by at least three "blank" pixels That is, it is assumed that a complete character has been scanned when the last "filled in" pixel stored in look-ahead buffer 18 is surrounded by an area of blank pixels, this area being at least three pixels high and three pixels wide. At that time, the data block stored in the look-ahead buffer is supplied to further processing means for identification of the potential character represented by that block of data.

Look-ahead buffer 18 is coupled to path tracer and feature analyzer 20 for the purpose of supplying thereto digital information representing the XY coordinates at the beginning and end points of each link, together with a digital representation of the particular link defined by those points (sometimes referred to as a "tag") and, optionally, digital representations of the two links (if any) joined by that link. Path tracer and feature analyzer 20 is adapted to operate in accordance with a program established therefor to trace a path from link to connected link based upon this supplied information.

Figure 2:
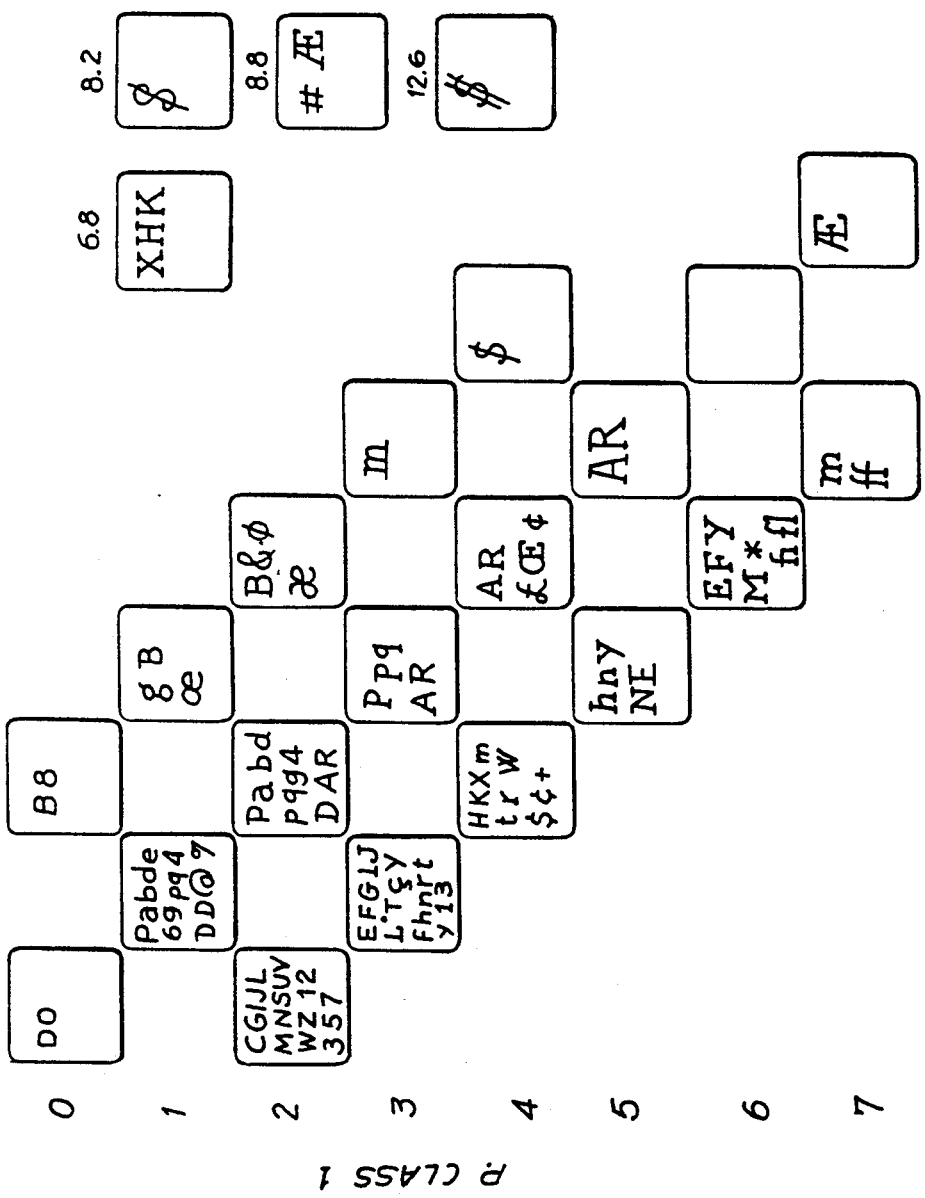
FIG. 2 is a chart illustrating the various sets of characters which are defined by the "class 1" and "class 3" points included therein.

Advantageously, this path tracing operation commences at a "class 1" point and terminates at another "class 1" point If the scanned image does not include any "class 1" points (examples of such characters are illustrated in FIG. 2), the path tracing operation commences at a "class 3" point; and if there are no "class 3" points, the scan tracing operation commences at a "class 2" point. Such path tracing is accomplished by following the XY coordinate data representing at least selected pixels included in the scanned image, as will be described in greater detail below. As a path is traced, changes in the XY data are sensed and used to determine the type of geographical feature being traced In addition to identifying the presence of a bay, the particular orientation of that bay (e.g. a bay which opens to the "north", "northeast", "east", "southeast", "south", "southwest", "west" or "northwest") also is determined. Path tracer and feature analyzer 20 also functions to trace a path commencing at a "class 3" point and to sense when a path returns to the same point from which it commenced, thus identifying the path as forming a lagoon. The position of the identified bays and lagoons relative to each other are ascertained as a function of the XY data defining the pixels, or points, from which the bays and lagoons are formed.

Path tracer and feature analyzer 20 also includes a smoother whose purpose is to eliminate artifacts from the thinned binary image. Such artifacts are referred to herein as "whiskers", which appear as small links that protrude from the image, "puddles" which appear as small lagoons, and "beaches" which appear as small zig-zag links. Whiskers may be detected as a function of their length, and thereafter removed. For example, a protruding link of no more than three pixels may be assumed to be a whisker. A small lagoon whose width and length are less than some threshold amount may be assumed to be a puddle And connected links which form a concavity (more fully explained below) of small size and of particular orientation with respect to preceding and following concavities (and convexities) may be assumed to be a beach. Whiskers, puddles and beaches are removed, or ignored, before geographical features are analyzed.

The data derived by path tracer and feature analyzer 20, that is, the data representing the types and relative positions of detected geographical features, are supplied to comparator 22. Also supplied to the comparator is an indication of the number of "class 1" and "class 3" points of which the scanned image is comprised. This point classification data identifies a particular set of characters having representative geographical feature data stored in a memory referred to herein as dictionary 24, and the detected geographical features are compared to the geographical features of the characters included in this stored set. As a result of this comparison, comparator 22 identifies the particular character which has been scanned. The comparator thus verifies that the detected geographical features are not arbitrary but, rather, constitute a known character. It converts an unknown image to a recognized character.

Comparator 22 is coupled to character separator 26 which functions to separate joined characters by "breaking" or ignoring one or more sensed links which join two characters that had been identified by comparator 22. It is anticipated that, in some instances, such as when printed characters are smudged or blurred, or dirt or ink extends between two printed characters, the geographical features derived by path tracer and feature analyzer 20 for one character will result in a favorable comparison to the characters stored in dictionary 24, but the geographical features which are detected by reason of the joining of the two characters will result in a failure to identify as a single character the joined characters. Character separator 26 cooperates with comparator 22 to recognize that two independent characters are joined by one or more links, and then functions to ignore (or electronically erase) those links so as to separate, or disjoin the joined characters. As a result, the two independent characters which otherwise are not identified by comparator 22 now are recognized.

Character separator 26 is coupled to rearranger 28 which is adapted to position the characters sensed by comparator 22 in respective horizontal lines. As mentioned above, image pick-up device 10 preferably is formed of a single column of CCD image sensing elements. Advantageously, this single column is of a greater longitudinal dimension than the expected width (or height) of a line of printed characters. In one embodiment, this single column of image sensors extends across three lines of characters printed in typical type font. In the preferred embodiment of this invention, character scanning is achieved in a top-to-bottom and right-to-left configuration. As a result, if three lines of characters are scanned in one "pass" of image pick-up device 10, it is expected that such characters will be identified in the following order: the rightmost (for the purpose of the present discussion, also referred to as the first) character of the top line followed by the first character of the second line, followed by the first character of the third line, followed by the second character of the first line, followed by the second character of the second line, followed by the second character of the third line, and so on. It is appreciated that the XY data which is generated in response to the scanning of each character includes maximum and minimum X coordinates as well as maximum and minimum Y coordinates. From this data, the average Y coordinate of each identified character may be ascertained. Such average Y coordinate thus indicates the particular line in which the identified character resides. Rearranger 28 functions to return the characters identified by comparator 22 to the appropriate lines from which they were scanned.

It is appreciated that rearranger 28 also functions to colineate characters which may be printed or presented to image pick-up device 10 in skewed alignment. The average Y coordinate or, alternatively, the "center of gravity" of each sensed character (the center of gravity may be derived by weighting the average Y coordinate as a function of the Y coordinates of all of the pixels which comprise the character) is determined to ascertain its relative vertical position on the page. This, in turn, determines the correct line in which the character is positioned. Thus, skewed characters may be rearranged in proper line-by-line alignment by rearranger 28.

FIG. 1 shows the output of character separator 26 additionally fed back to path tracer and feature analyzer 20. This is because once two joined characters are detected and the link (or links) between them is broken, the data block representing each separated character should be analyzed to confirm or ascertain its identity.

The output of rearranger 28 is coupled to character reconstructor 29 for detecting "hard" breaks in a character and for joining the data blocks of those hard broken portions of a character to form a complete data block. That is, it is expected that a hard break will be represented by, for example, two unrecognized data blocks of relatively small size (i.e. small height and width dimensions), known as "out of range" data blocks, or one unrecognized out of range data block and one within range data block. Based on the center of gravity of these data blocks, as well as the proximity of the respective links therein, the two data blocks may be close enough to be joined. A joint that connects the hard broken blocks is provided, and the joined blocks then are viewed simply as a within range block. This data block is fed back to path tracer and feature analyzer 20 to allow identification of the image represented by that data block. However, if hard breaks are not detected, for example, if rearranger 28 does not supply any out of range blocks, character reconstructor 29 is effectively by-passed and the rearranger supplies the recognized character to output 30.

As shown in FIG. 1, the rearranger is coupled to output 30 which may be any suitable output device. For example, output 30 may comprise a display screen for displaying the optically read characters, word processing apparatus for "creating" a document from the optically sensed characters, communication apparatus for transmitting electronic representations of the optically sensed characters, or other output means. In a particular utilization of the instant invention wherein the characters which are scanned by image pick-up device 10 comprise an address printed or otherwise written on an envelope, output device 30 may comprise mail sorting equipment which functions to sort such envelopes as a function of the detected zip code and address information printed thereon.

A more detailed explanation of particular functions carried out by the system illustrated in FIG. 1 is set out below.

Figure 1A:
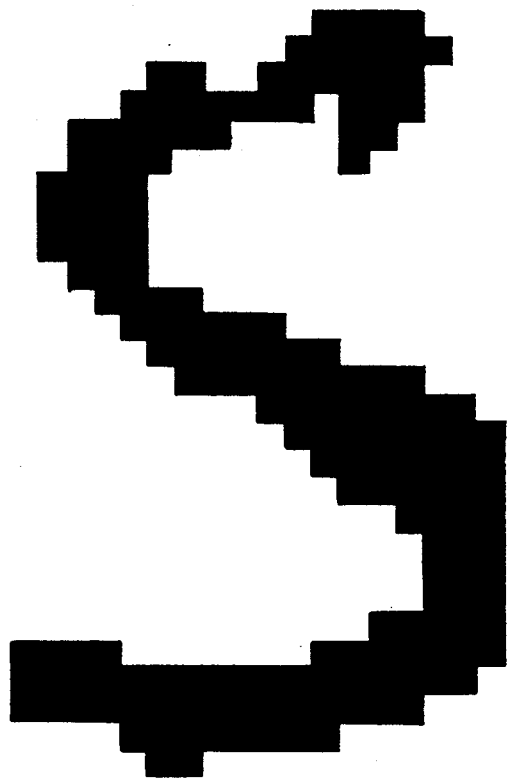
FIGS. 1A, 1B and 1C represent the pixels which are generated as a result of scanning two examples of characters and are helpful in understanding some of the operation of the system shown in FIG. 1.

Relative movement is provided between image pick-up device 10 and the page or other support upon which the characters to be identified are printed. As mentioned above, in the preferred embodiment, image pick-up device 10 is comprised of a single column of image sensors, and the relative movement between this column of image sensors and the page of characters results in a right-to-left scanning of the characters. It is contemplated that left-to-right scanning may be used, if desired. As also mentioned, the column of image sensors extends across plural lines of characters; and each image sensor is sampled (or polled) in series, resulting in a top-to-bottom and then right-to-left scanning of the characters. As each image sensor is sampled, the dark/light image sensed thereby is detected; and each detected image sample is quantized and "binarized" to represent black or white information in the form of binary "1" or binary "0". Each image sample thus represents a pixel; and that pixel may be black or white as illustrated in FIG. 1A. As right-to-left movement between the image sensors and the optically read character proceeds, the raster image illustrated in FIG. 1A is generated. For the purpose of the present discussion, it is assumed that image pick-up device 10 is scanning the character "S".

It is appreciated that portions of the raster produced by image pick-up device 10 are relatively thick, that is, they are formed of plural pixels. Image thinning control 12, which is described in greater detail in U.S. Pat. Nos. 4,539,704 and 4,574,357, converts such thicker portions of the detected image to a relatively thin image formed of links (or lines) which, preferably, are no thicker than the dimension of one pixel. The links and points which constitute this thinned image then are identified by link identifier 14.

Figure 1B:
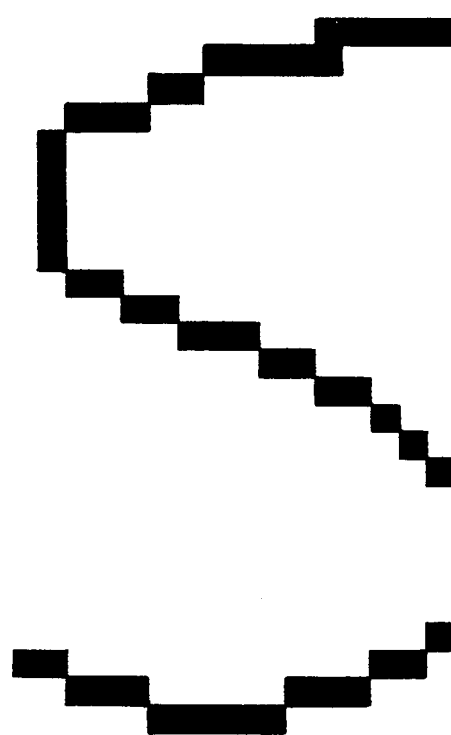

The thinned image shown in FIG. 1B is produced in real time, that is, it is produced while image pick-up device 10 scans a character presented for optical recognition. For the purpose of simplification, the possible presence of whiskers and beaches that might appear in the thinned image have been omitted from FIG. 1B. It will be appreciated, however, that if these artifacts occur, they will be removed by the smoother included in path tracer and feature analyzer 20, as mentioned above.

When the first column of the thinned image is detected, the XY coordinates of the pixels therein (shown as rows 19, 20 and 21 in column 1 of FIG. 1B) are determined and stored. These pixels comprise a link and this link is "tagged" for future reference. The starting and ending points of this tagged link are stored, for example, in look-ahead buffer 18.

When the next column (column 2) of FIG. 1B is scanned, the pixels at rows 18 and 22, respectively, are sensed; and the pixel in row 18 is tagged as part of a second link while the pixel at row 22 is tagged as part of a third link. By the juxtaposition of the pixel at column 2, row 18 to the pixel at column 1, line 19, the starting point of this second link is assumed to be the same as the starting point of the first link. Similarly, by reason of the juxtaposition of the pixel at column 2, line 22 to the pixel at column 1, line 21, the starting point of this third link is assumed to be the same as the ending point of the first link.

When column 3 in FIG. 1B is scanned, the pixel at row 1 is detected and it is assumed that this pixel constitutes the beginning of a fourth link The XY coordinates of this pixel are stored as the starting point of this fourth link.

Continuing with the scanning of column 3, the pixel at row 17, by reason of its juxtaposition to the pixel at column 2, row 18, is assumed to be a portion of the second link. Likewise, by reason of the juxtaposition of the pixel at column 3, row 23 to the pixel at column 2, row 22, this pixel at column 3, row 23 is assumed to be included in the third link.

The foregoing scanning continues from column to column until all of the links have been tagged, and the starting and ending points of each link have been stored. It will be recognized that, when the pixel at column 10, row 26 is detected, it initially is assumed that this pixel is included in the third link which commenced at column 1, row 21. However, when the pixels at column 11, row 26, column 12, row 26 and column 13, row 26 are detected, the pixels at row 26 spanning columns 9-13 are tagged as being included in, for example, a fifth link. Thus, notwithstanding initial link-tagging of pixels, such tagging may subsequently be changed to more accurately reflect the correct link in which those pixels are disposed.

From the brief description of the manner in which the links and their respective starting and ending points are tagged, identified and stored, it is appreciated that the ending point of one link is, in many instances, the starting point of a connected link. A point to which two and only two links are joined is designated a "class 2" point. However, a point that begins or ends a link, such as the point at column 3, row 1 and the point at column 18, row 24, that is, a "free" point, is designated a "class 1" point. Although, as is apparent from FIG. 1B, the character "S" does not contain a point which forms the juncture of three links, such a point is designated a "class 3" point. Likewise, a point which forms the juncture of four links, such as the intersection in the letter "X", is designated a "class 4" point. As mentioned above, alphanumeric characters preferably are grouped in sets, and each set is specified by the number of "class 1" and "class 3" points common to all of the characters in that set. For the purpose of such set determination, a "class 4" point is interpreted as being equal to two "class 3" points.

As will be described more fully below, the beginning of a binarized image is detected when a "black" pixel first is sensed after sensing at least three "white" pixels in a "neighborhood" that precedes that black pixel. This represents the beginning of a block within which the character is positioned. Likewise, the end of the image is detected when, after sensing a block pixel, at least three white pixels in a neighborhood that follows that block pixel are detected. This represents the end of the character block.

The aforementioned tagging, or identification, of each link, and the identification and storage of the critical points (i.e. the "class 1", "class 2", and "class 3" points) of a scanned image are determined by link identifier 14. Although not shown in FIG. 1B, it may turn out that a character is improperly formed or, because of dirt or noise, or because of some other interference, a pixel which should be "black" erroneously is "white", or blank. This is referred to as a "soft" break in the image. For example, the black pixel at column 4, line 16, may be omitted. In that event, link identifier 14 might erroneously identify the pixel at column 3, line 17 as a "class 1" point and the pixel at column 5, line 15 as a "class 1" point These erroneously identified "class 1" points might be assumed to be the end and beginning, respectively, of separate links In actuality, however, such separate links should be included in the same broken link; and the pixel at column 4, line 16 should be black. Link connector 16 functions to interpolate such a blank pixel found at column 4, line 16 and serves to "fill in" this soft blank. Such interpolation will be described hereinbelow in conjunction with the matrices illustrated in FIGS. 6A and 6B.

Look-ahead buffer 18 temporarily stores the link-tag preliminarily assigned to each pixel, subject to a change in the link-tag as further columns of the image are scanned and examined. In accordance with the example mentioned above, when the pixel at column 9, line 26 is detected, this pixel initially is tagged as being included in the third link; and look-ahead buffer 18 stores this initial tag. Likewise, when the pixel at column 10, line 26 is detected, look-ahead buffer 18 tags this pixel as being included in link 3. However, after the pixels at column 12, row 26 and column 13, row 26 are detected, the initial tags of the pixels at row 26, columns 9, 10 and 11 are expected to be changed over from link 3 to, for example, link 5. As will be described, look-ahead buffer 18 advantageously has the capacity to store at least seven columns of pixel data. That is, the link-tags of up to seven columns of pixels can be stored in the look-ahead buffer Alternatively, and if desired, the storage capacity of the look-ahead buffer may be increased to any desired size, including a storage capacity capable of storing all of the pixels included in a typical character (e.g. 20-30 columns of approximately 1,024 rows in each column) As determined by link identifier 14 in conjunction with link connector 16 and look-ahead buffer 18, the XY coordinates of the "class 1", "class 2" and "class 3" points which are detected in the scanned image are supplied to path tracer and feature analyzer 20. Data representing the links to which each "class 1", "class 2" and "class 3" point is connected (i.e. link-tag information) are supplied to the path tracer and feature analyzer.

The XY coordinate data supplied to path tracer and feature analyzer 20, together with the link-tag data is sufficient to reproduce the scanned image by converting such XY coordinate data to viewable images. Of course, as mentioned previously, each critical point represented by its XY coordinates is identified as a "class 1" or a "class 2" or a "class 3" point. It is appreciated that each "class 3" point is joined, by means of a respective link, to yet another point which, of course, may be a "class 1" or a "class 2" or a "class 3" point. Since each "class 3" point is formed by the juncture of three links, it is recognized that three separate paths may be traced from each "class 3" point. The points which are joined to a particular "class 3" point may be viewed as the free ends of spokes extending outwardly from this "class 3" point and the identities of such free ends are stored in a particular, predetermined order. In the preferred embodiment, this order is a clockwise order such that the points which are joined to the "class 3" point in question are identified in this clockwise order. It is appreciated that this clockwise order may be determined easily by referring simply to the XY coordinates of each such point. A particular example of how this clockwise arrangement is used will be described hereinbelow in conjunction with the example shown in FIG. 4.

After the identities of the remote points to which each "class 3" point is joined are arranged in the aforementioned clockwise order, paths are traced from, for example, one "class 1" point to another. As each path is traced, the change in the direction of that path when passing from one critical point to another is sensed as a function of changes in the X and Y coordinates. Such changes are recognized as either "convex" or "concave" changes. Convex changes are substantially ignored; but concave changes represent the presence of a bay. For the purpose of determining whether a change in the traced path is convex or concave, a link extending from a previous point to the present point is temporarily assumed to be the x-axis (with the present point coinciding with the origin thereof), and the link extending from the present point to the next point in the traced path is examined to determine if it extends into either the first or second quadrant relative to that x-axis. If so, the path from the previous point to the present point and thence to the next succeeding point is viewed as concave and, thus, is indicative of a bay. If, when continuing the traced path a "class 1" point is reached, the total concavity of this traced path is analyzed, based upon the overall changes in the X and Y coordinates which are encountered, to determine the direction in which this bay faces. As a result of this investigation, the bay is categorized as a "bay north", a "bay northeast", a "bay east", a "bay southeast", a "bay south", a "bay southwest", a "bay west", or a "bay northwest". As will be described below, suitable decimal digits may be assigned to each of the aforementioned bay classifications to provide easy identification thereof.

Preferably, the presence of a concavity in a traced path is determined by examining only three successive points, as aforementioned. It may turn out that what should have been detected as a relatively straight line is, in actuality, sensed as a number of interconnected links with relatively small changes in direction from link to link. Rather than sensing relatively small concavities (referred to as "beaches") that may be present among every three links, path tracer and feature analyzer 20 includes a smoother that operates to ignore such beaches and effectively replaces them with a single link. A beach is detected as a function of its size (typically less than 1/16 of the overall area of the character) and its orientation with respect to preceding and following concavities and convexities, as well as the sizes of those concavities and convexities.

After tracing paths from one "class 1" point to another, or if there are no "class 1" points, paths which had not been traversed previously are traced commencing at a "class 3" point (or if there are no "class 3" points, path tracing begins at a "class 2" point). Typically, the tracing of such previously untraced paths from a "class 3" point results in a circuitous path, i.e. the particular "class 3" point from which this tracing commences is the very same "class 3" point upon which this path-tracing ends. The XY coordinates of the respective points included in a sensed lagoon represent the position of the lagoon relative to previously detected bays.

If, after traversing the aforementioned circuitous path from a "class 3" point there exist any further paths which had not yet been traversed, such further paths are traversed in the manner just described. Typically, this further path-traversal also results in the tracing of a circuitous path; and the existence and relative location of the lagoon formed by this additional circuitous path likewise is determined.

As a result of the operation of path tracer and feature analyzer 20, the relative locations of bays and lagoons are ascertained. For example, when the image illustrated in FIG. 1B is analyzed by the path tracer and feature analyzer, the resultant analysis determines the existence of a bay east disposed on top of (hereinafter "above") a bay west. That is, the analysis of this image results in the conclusion that a bay facing in the eastward direction is disposed above a bay facing in the westward direction. These identified geographical features are compared in comparator 22 to a set of geographical features which are represented by data stored in dictionary 24. The particular set of stored geographical features to which the detected geographical features are compared is determined by the number of "class 1" and "class 3" points of which the scanned image is comprised. From FIG. 1B, it is appreciated that the character "S" includes two "class 1" points and no "class 3" points. In the set of characters formed of two "class 1" points and no "class 3" points stored in dictionary 24, the characters "S" and "5" both contain a bay east over a bay west. However, ambiguities are resolved on the basis of size and location of these bays, and the scanned image is recognized as the character "S".

Figure 1C:
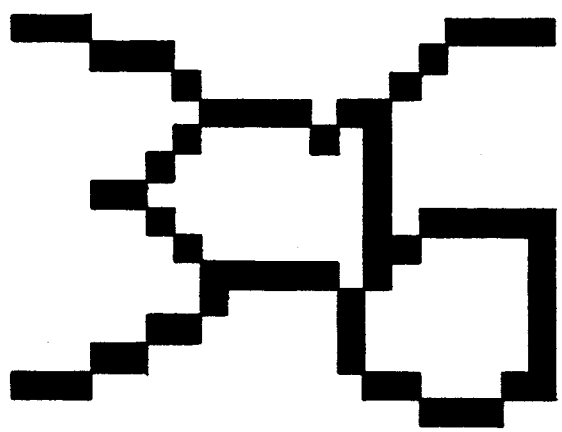

Let it now be assumed that the arrangement of images illustrated in FIG. 1C is presented for recognition. Empirically, it is appreciated that this arrangement is the numeral "36"; but with undesired connections between the digit "3" and the digit "6". Such erroneous connections will prevent the proper recognition of the characters which constitute "36". During the path tracing operation carried out by path tracer and feature analyzer 20, the following geographical features will be detected a bay east above a lagoon, this combination being next to a bay north above a lagoon which, in turn, is above a bay south, and this arrangement is next to a bay west above a bay west. The particular set of characters to which this combination of geographical features is compared is not found in dictionary 24. The image of FIG. 1C is seen to be formed of three "class 1" and five "class 3" points. As will be appreciated from the description set out below with respect to FIG. 2, these critical points establish the set of characters to which the detected geographical features are compared; and the geographical features for this set, as stored in dictionary 24, are completely different from the detected features. However, character separator 26, in conjunction with comparator 22 and dictionary 24, indicates that the combination of a bay east above a lagoon constitutes at least one character whose geographical features are stored in dictionary 24. Consequently, character separator 26 assumes that any links which extend from an image whose geographical features are constituted by a bay east above a lagoon are erroneous links. Accordingly, the illustrated links between the numerals "3" and "6" are disregarded; and the data blocks representing these two separate and independent images are analyzed once again to ascertain the number of "class 1" and "class 3" points in each and then the geographical feature analysis by the path tracing operation is repeated. Now, the first image is detected as having one "class 1" point and one "class 3" point and, moreover, consists of a bay east above a lagoon. Comparator 22 determines that this scanned image corresponds to the numeral "6".

Next, the second of the scanned images is recognized as containing two "class 1" and no "class 3" points. Furthermore, by reason of the geographical feature analysis mentioned above, it is concluded that this image consists of a bay west above a bay west. When the appropriate set of characters stored in dictionary 24 (i.e. the set consisting of only two "class 1" points) is accessed, comparator 22 recognizes this scanned image as the numeral "3".

Thus, it is appreciated that character separator 26 functions to break, or ignore, those links between two otherwise independent images, thus permitting those images to be recognized. Furthermore, the character separator serves to identify such improper linkage between images.

Rearranger 28 will be described below and, for the moment, further explanation is not provided.

Character reconstructor 29 is coupled to rearranger 28 and is supplied with at least one out of range data block. That is, in the event of a hard break present in a scanned image, as mentioned above, rearranger 28 supplies the character reconstructor with a data block whose overall size is less than the size of blocks containing image data representing characters that have been recognized. Based upon the XY coordinates of pixels in this out of range block and the XY coordinates of pixels in adjacent blocks, character reconstructor 29 senses the distance between this block and the block closest thereto. The out of range block then is joined to that closest block by inserting a link therebetween (referred to as a "joint"), and the overall size of the joined blocks is examined If this resultant block is within range, the image data therein is fed back to path tracer and feature analyzer 20 for analysis in the manner mentioned above. However, if the overall size of the resultant block is too large, the joint is not established. Rather, the small, out of range block is joined to another adjacent block and the foregoing examination and analysis is repeated.

Thus, a hard break is detected when rearranger 28 supplies an out of range data block to character reconstructor 29 and the character reconstructor "fills in" this break by joining the out of range block to an adjacent block which may or may not be an out of range block itself. If no out of range blocks are detected, FIG. 1 indicates that character reconstructor 29 may be bypassed; and the characters which are rearranged into proper order by the rearranger are simply supplied to output device 30.

Output device 30, as mentioned above, may comprise a conventional device for displaying, communicating or otherwise utilizing the data representing the recognized characters. The output device forms no part of the present invention per se and, in the interest of brevity and simplification, further description thereof need not be provided.

Turning to FIG. 2, there is illustrated a chart representing the sets of characters containing the indicated "class 1" and "class 3" points (it being recalled that a "class 4" point, such as the intersection in the character "X", is construed as two "class 3" points). In this chart, the abscissa represents the number of "class 3" points and the ordinate represents the number of "class 1" points included in a character.

It is appreciated that the set of characters formed of no "class 1" points and no "class 3" points consists simply of the letters "D" and "0". The set of characters formed of two "class 1" points and no "class 3" points is seen to be those letters and characters included in the rectangle defined by the intersection (0,2), that is, in the rectangle defined by x=0 and y=2 in the illustrated chart. These characters are seen to be "basic" characters without serifs or embellishments It is recognized that the same letter might be included in two or more sets of characters because that letter may be an embellishment of the basic letter. An example of this is shown as the letter "B" which appears without serifs in the set formed of no "class 1" points and two "class 3" points, is provided with one serif in the set formed of one "class 1" point and three "class 3" points and is provided with two serifs in the set formed of two "class 1" points and four "class 3" points.

It is appreciated that the operation of comparator 22 is significantly simplified merely by requiring the detected geographical features of an image to be compared to the geographical features of a relatively small number of characters (i.e. the geographical features of the characters stored in a particular set) rather than comparing the detected geographical features to all possible geographical features of all possible characters. By utilizing point classifications (i.e. the number of "class 1" and the number of "class 3" points included in a scanned image) together with the detected geographical features of the scanned image, the need for a template comparison of reference characters to the scanned image is obviated.

Figure 3A:
FIGS. 3A–3G are examples of the geographical features included in representative alphanumeric characters.

FIGS. 3A-3F are representative examples of typical alphanumeric characters and the particular geographical features of which these characters are formed. As shown in FIG. 3A, and as has been described above with respect to FIG. 1B, the letter "S" is formed of a bay east above a bay west. It also is noted that this character consists of two "class 1" points and no "class 3" points.

Figure 3B:
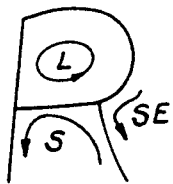

The character "R" of FIG. 3B is formed of a bay southeast next to the combination of a lagoon above a bay south. Furthermore, this character includes two "class 1" points and two "class 3" points. From the chart shown in FIG. 2, it is seen that this particular set of characters includes eleven separate characters; but only one of these eleven separate characters is formed of a bay southeast next to the combination of a lagoon above a bay south.

Figure 3C:
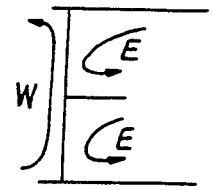
Figure 3D:
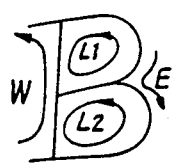
Figure 3E:
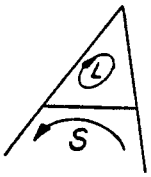
Figure 3F:

Similarly, the letter "E" of FIG. 3C contains two serifs and is formed of five "class 1" points and three "class 3" points, and consists of a bay east above a bay east, this combination being next to a bay west. From the chart shown in FIG. 2, one and only one character contains these geographical features in the set defined by five "class 1" and three "class 3" points. The character "B" shown in FIG. 3D will be described in connection with a detailed analysis thereof, as set out below. It is noted, however, that this character contains two serifs and is formed of two "class 1" points and four "class 3" points; and in the appropriate set illustrated in FIG. 2, the letter "B" is the only character formed of a bay east next to the combination of one lagoon over another lagoon, this combination being next to a bay west. Similarly, the character "A" shown in FIG. 3E is illustrated as a basic character (with no serifs) and is the only character included in the set defined by two "class 1" points and two "class 3" points formed of a lagoon above a bay south. Likewise, the numeral "6" shown in FIG. 3F is the only character included in the set formed of one "class 1" point and one "class 3" point formed of a bay east above a lagoon. It is seen that the character "b", which also is included in this set, differs from the numeral "6" in that the letter "b" is formed of a bay northeast above a lagoon. This small but important difference in the direction of a bay, that is, the direction in which the bay opens, is important to proper recognition of a scanned character.

Figure 3G:
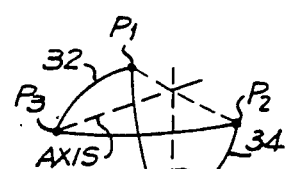

In characterizing the direction of a bay, three points which define that bay are examined: the two points which define its "mouth" and the one point which lies on or near the "axis" of the bay. It will be appreciated that the axis intersects the mouth from a minimal point on the bay. As an example, depending upon the direction of this axis and the location of the minimal point, a bay may open in the north or northeast direction even though the same two points define its mouth. This is represented in FIG. 3G wherein points $P_1$ and $P_2$ define the mouth of bay 32 and also of bay 34. Point $P_3$ is the minimal point of bay 32 and lies on the axis of that bay. Likewise, point $P_4$ is the minimal point of bay 34 and lies on the axis of bay 34. However, with the common mouth defined by points $P_1$ and $P_2$, bay 32 opens to the northeast and bay 34 opens to the north. Minimal points $P_3$ and $P_4$ thus characterize the directions of these bays.

Figure 4:
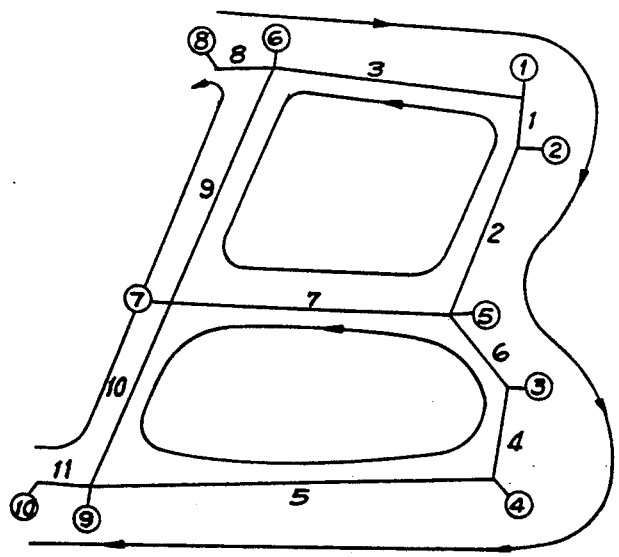
FIG. 4 is useful in understanding the manner in which an alphanumeric character ("B") is analyzed and identified.
Figure 5:
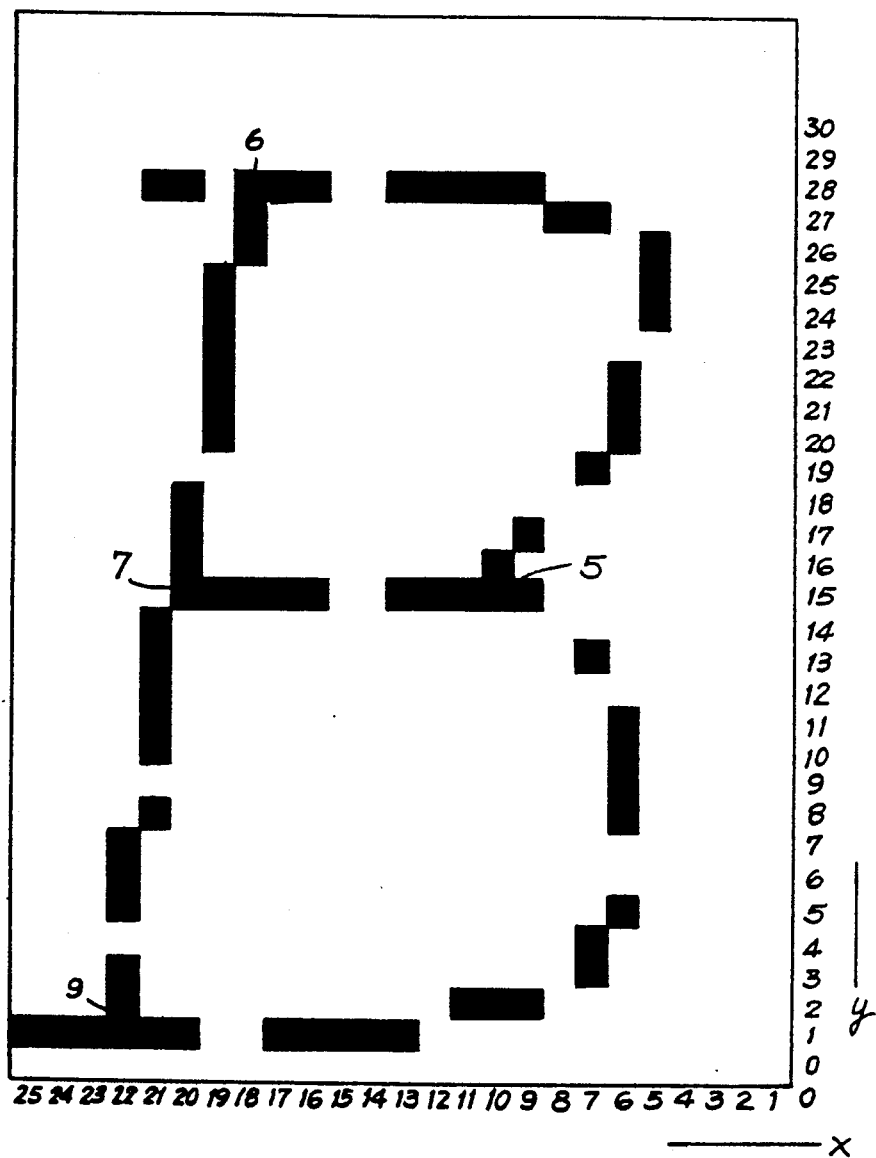
FIG. 5 represents a typical pixel arrangement of a scanned alphanumeric "B" with "soft" breaks.

FIG. 4 is a representation of the character "B" that, as an example, had been presented to link identifier 14 and link connector 16 as the thinned image represented in FIG. 5. The manner in which the image shown in FIG. 5 is interpolated to be analyzed in accordance with the representation shown in FIG. 4 will be described below. The present description is intended to facilitate an understanding of the manner in which path tracer and feature analyzer 20 operates.

It should be recognized that when the binarized image shown in FIG. 5 is scanned by link identifier 14 and link connector 16, the various points which define the beginning and ends of each link are detected; and the XY coordinate of each is stored in a suitable memory. Based upon such XY data, it is known that point 1 (FIG. 4) is linked to points 6 and 2, that point 2 is linked to points 1 and 5, that point 5 is linked to points 2 and 3, that point 3 is linked to points 5 and 4, and so on. It also can be ascertained that a particular point which is linked to three points is a "class 3" point. The "class 3" points shown in FIG. 4 are seen to be points 5, 6, 7 and 9. With respect to point 5, it is seen that this point is linked by respective links to points 7, 2 and 3. It is recalled that the identities of the points to which this "class 3" point is linked are arranged in clockwise order. Commencing, arbitrarily, with point 7, the clockwise order of the points to which point 5 is linked consists of points 7, 2 and 3.

Likewise, the clockwise order of the points to which point 6 is linked is seen to be points 8, 1 and 7. In similar fashion, the clockwise order of the points to which point 7 is linked is points 6, 5 and 9. Finally, the clockwise order of the points to which point 9 is linked is points 10, 7 and 4. Thus, the "class 3" points are identified and the identities of those points to which each "class 3" point is linked are stored in a suitable memory in clockwise order.

Next, all paths extending from one "class 1" point to another are traced. From the scanning of the binarized image shown in FIG. 5, the "class 1" points are identified as points 10 and 8. While there is no particular "class 1" point from which the path tracing operation should commence, it is assumed, merely for convenience, that this operation commences from point 10.

Point 10 is linked to point 9. Point 9 is a "class 3" point and, from this point, two different paths may be followed. However, in view of the clockwise order of points which are stored for "class 3" point 9, it is appreciated that a path which arrives at this point from point 10 should depart from this point to point 7. Thus, the path 10-9-7 is traced.

In view of the change in X and Y data from point 10 to point 9 and from point 9 to point 7, the relative concavity (or convexity) of this path is examined. As mentioned above, the link from point 10 to point 9 is assumed to reside on the x-axis with point 9 as the origin. The link from point 9 to point 7 is seen to extend into the first quadrant and, thus, the path 10-9-7 represents a concavity.

Upon arriving at point 7, a "class 3" point, two different paths may be followed. However, in view of the clockwise arrangement of points linked to point 7, it is appreciated that a path arriving at point 7 from point 9 must leave point 7 to point 6. The path 9-7-6 now is followed.

On arriving at point 6, alternative paths may be traced from point 6 to point 8 or to point 1. From the aforementioned clockwise order of points to which point 6 is coupled, it is appreciated that, when a path is traced from point 7 to point 6, the next following path departs from point 6 to point 8. Now, if the path 7-6 is disposed along the x-axis (with point 6 coincident with the origin), it is seen that the path 6-8 extends into the second quadrant. Hence, it is concluded that the path 7-6-8 exhibits a concavity.

In view of the concavities exhibited by paths 10-9-7 and 7-6-8, a bay is formed by the path traced from "class 1" point 10 to "class 1" point 8. Furthermore, by examining the mouth of this bay defined by points 10 and 8, and by examining the minimal point on this bay, which is point 7, it is concluded that this bay faces in the westward direction. Hence, this bay is identified as a bay west.

Another path extends between "class 1" point 8 and "class 1" point 10. Commencing at point 8, this point is linked to point 6; and, as is recalled from the clockwise order of points to which point 6 is connected, a path arriving from point 8 departs in the direction to point 1.

From the XY coordinate data that is stored with respect to the character shown in FIG. 4, it is known that point 1 is linked to point 2; and the path 6-1-2 is examined for concavity. If the path 6-1 is disposed along the x-axis (with point 1 coincident with the origin), it is seen that the path 1-2 does not extend into the first or second quadrant. Hence, the path 6-1-2 is determined to be a convex path.

Continuing from point 2 to point 5, the path 1-2-5 also is examined for concavity. It is appreciated from the foregoing description of determining whether a three-point path is concave or convex that the path 1-2-5 is convex.

When arriving at point 5 from point 2, the next path to be followed extends to point 3. The determination that the path 5-3 rather than the path 5-7 should be followed is recognized from the clockwise order of points to which point 5 is linked.

Now, examining the path 2-5-3, it is appreciated that this path exhibits a concavity. Thus, it is determined that path 2-5-3 defines or is at least included in a bay.

Continuing from point 3, this point is linked to point 4 and thence the path extends to point 9. Analysis of the paths 5-3-4 and 3-4-9 result in the conclusion that these paths exhibit convexities.

From point 9, the clockwise order of points to which this point is linked results in the conclusion that the path then extends to point 10. This completes a path tracing from "class 1" point 8 to "class 1" point 10.

From the XY coordinate data representing points 1, 2, 5, 3 and 4, and particularly by examining the points which define the mouth of the bay and the minimal point on that bay, it is concluded that the bay formed by this path opens in the eastward direction. Hence, this bay is identified as a bay east; and its location is ascertained by its XY coordinates.

From the foregoing path tracing between the "class 1" points, it is appreciated that several paths which include the "class 3" points 5, 6, 7 and 9 have not been traced That such untraced paths remain is determined from examining the XY data representing these "class 3" points and the XY data representing each point connected thereto which has been traced. Now, the remaining untraced paths are followed. As an example, commencing at point 5, let it be assumed that this point is reached from point 7. From the clockwise order of points to which point 5 is connected, it is recalled that, when point 5 is reached from point 7, the next path extends to point 2. Then, continuing, point 2 is connected to point 1 and point 1 is connected to point 6. If point 6 is reached from point 1, the next following path from point 6 extends to point 7. Likewise, when point 7 is reached from point 6, the next following path extends to point 5. Now, by tracing a path commencing at point 5, a circuitous path is followed which returns to point 5. Hence, a lagoon is detected.

Notwithstanding the tracing of the path which forms the above-mentioned lagoon, there still remains an untraced path which includes "class 3" points 5, 7 and 9. Returning once again to point 5, and proceeding in a counterclockwise direction, if it is assumed that point 5 is reached from point 3, then the path from point 5 extends to point 7. This path then extends to point 9 and, thereafter, to point 4. Point 4 is linked to point 3 and this point, in turn, is linked to point 5. Once again, a circuitous path has been traced, and this is determinative of the presence of a lagoon.

From the preceding discussion, it will be apparent that each and every path which includes a "class 3" point now has been traced. As a result of such path tracings, the presence of a bay east, a bay west and two lagoons has been detected. From the XY coordinates representing the "class 3" points and those other points to which each "class 3" point is connected, it is determined that a bay east is next to the combination of one lagoon over another, and this combination of lagoons is, in turn, next to a bay west. From the chart shown in FIG. 2, the only character included in the set defined by two "class 1" points and four "class 3" points which includes this particular arrangement of geographical features is the letter "B". Thus, the character shown in FIG. 4 is recognized as the letter "B".

As mentioned above, when scanning a character to be recognized, it may turn out that, after the thinning process carried out by image thinning control 12, one or more pixels which are included in a particular link nevertheless remain "blank". For example, in binary notation, a binary "0" may be used to represent background and a binary "1" may be used to represent the presence of a mark. A blank pixel thus corresponds to a binary "0" and a "filled in" pixel corresponds to a binary "1". An example of blank pixels included in a thinned image being scanned is illustrated in FIG. 5. It will be appreciated that the pixel whose XY coordinates are (6, 27), as indicated by the columns (X) and rows (Y) of FIG. 5, is blank but should be filled in (that is, this pixel is represented as a "0" but should, in fact, be represented as a "1"). Similarly, the pixel at location (6, 23) or the pixel at location (5, 23) should be filled in. Other examples of blank pixels which should be filled in are evident from even a cursory inspection of FIG. 5. Such blank pixels are referred to as "soft breaks" in the image.

The manner in which these soft breaks are filled in for the purpose of completing a link will be described in conjunction with the matrices shown in FIGS. 6A and 6B.

It is recalled that the thinned image (or, alternatively, data representing the thinned image) is scanned in a top-to-bottom and right-to-left direction. Preferably, a column of image sensors which is dimensioned to span at least the entire height of an image is moved from right to left to sample the image in successive columns. At each sampling location, the image sensors are polled sequentially from the top of the column to its bottom. Thus, in the embodiment shown in FIG. 5, the pixels disposed at x=5, that is, column 5, are sensed in sequence such that the pixels at locations (5, 26), (5, 25) and (5, 24) are sensed. Then, the column of image sensors advances to sense the pixels located in column 6 and then the pixels in column 7, and so on. As the illustrated image is scanned column-by-column, representations of the sensed pixels are stored in, for example, corresponding memory locations in a look-ahead buffer. In the preferred embodiment, this look-ahead buffer is capable of storing pixel information disposed in seven successive columns. Alternatively, the look-ahead buffer might have a storage capacity sufficient to store all of the pixel information contained in the entire image which is scanned.

As pixel information is entered into the look-ahead buffer, a "neighborhood" surrounding each filled in pixel, that is, a pixel represented as a binary "1", is analyzed to determine the proximity of that pixel to other filled in pixels. For example, the pixel at location (5, 26), the first pixel to be sensed in the image, is examined. Examination is carried out by using the matrix shown in FIG. 6A as follows: the filled pixel at (5, 26) is placed at the origin of this matrix. Then, the relative distance between this pixel and each of the two closest filled pixels at locations (5, 25) and (7, 27) is determined. If the matrix shown in FIG. 6A now is superimposed over these pixels, it is seen that the relative distance between the pixel at location (5, 26) and the pixel at location (5, 25) is represented as the dimensionless numeral 1; and the distance between the pixel at location (5, 26) and the pixel at location (7, 27) is represented by the dimensionless number 4. From FIG. 6A, it is seen that the pixel at location (5, 25) is located in the third quadrant $Q_{III}$ relative to the origin, and the pixel at location (7, 27) is located in the second quadrant $Q_{II}$. In view of the proximity to each other of the pixels at locations (5, 25) and (7, 27), examination is made utilizing the matrix shown in FIG. 6B to determine the relationship therebetween. This matrix serves as a guide as to whether the pixel at (7, 27) in quadrant $Q_{II}$ should be connected to the pixel at (5, 25) in quadrant $Q_{III}$. In this regard the distance from the pixel at the origin (5, 26) to the pixel in quadrant $Q_{II}$ is measured along the abscissa labeled $Q_i$ in FIG. 6B, and this has been found to be the dimensionless number 4. Likewise, the distance from the origin to the pixel in quadrant $Q_{III}$ is measured along the ordinate labeled $Q_{i+1}$ in FIG. 6B, and this has been found to be the dimensionless number 1. The intersection of these two points in the FIG. 6B is represented by the dimensionless number 6, and represents the distance between the pixels at locations (5, 25) and (7, 27). Since this distance is greater than the distance from the pixel at (5, 26) to the pixel at (5, 25) and also is greater than the distance from the pixel at (5, 26) to the pixel at (7, 27), the pixels at (5, 25) and (7, 27) are not joined. However, the pixel at (5, 26) is close enough to be joined to the pixel at (7, 27); and the pixel location (6, 27) is artificially filled in to close the "soft break". The look-ahead buffer is provided with information representing that the pixel at (6, 27) is artificially filled in.

Next, the filled pixel at location (5, 25) is examined. Since this pixel is adjacent two filled pixels, a soft break is not present therebetween. However, the pixel at location (5, 24) is adjacent one filled pixel at (5, 25) and a blank pixel at (5, 23) and also a blank pixel at (6, 23). Hence, a soft break is detected, and the pixel at (5, 24) is analyzed by use of the matrix shown in FIG. 6A. As before, the origin is placed at the pixel in question, i.e. at location (5, 24), and the distance from this pixel to the pixel at (5, 25), which already has been examined, is represented by the dimensionless number 1 in quadrant $Q_I$. Also the distance from the pixel at (5, 24) to the pixel at (6, 22) is represented by the dimensionless number 4 in quadrant $Q_{III}$. The matrix of FIG. 6B is used to determine if pixels in adjacent quadrants should be connected; and since quadrants $Q_I$ and $Q_{III}$ are not adjacent, this matrix is not relied upon herein. Nevertheless, in view of the relative proximity of the pixels at (5, 24) and (6, 22), these two pixels should be joined, and the soft break therebetween is closed by filling in the pixel at (5, 23). The look-ahead buffer is provided with information that the pixel at (5, 23) is artificially filled in.

Since there are no other filled pixels remaining for examination in column 5, the analysis of this column is completed. Next, a similar analysis of the pixels in column 6 is carried out. First, the filled pixel at (6, 22) is examined, and this pixel is found to be adjacent the artificially filled pixel at (5, 23) and the filled pixel at (6, 21). Here too, no soft break is detected. Likewise, each of the pixels at (6, 21) and at (6, 20) is adjacent two filled pixels, thus indicating the absence of a soft break.

The next filled pixel in column 6 to be examined is at (6, 11). This pixel is adjacent the pixel at (6, 10) in quadrant $Q_{III}$ and is separated from the pixel at (7, 13) in quadrant $Q_{II}$. From the matrix of FIG. 6A, the distance between the pixels at locations (6, 11) and (7, 13) is the dimensionless number 5. Of course, the distance between the pixels at locations (6, 11) and (6, 10) is the dimensionless number 1. Since the closest pixels to the pixel at location (6, 11) are in adjacent quadrants $Q_{II}$ and $Q_{III}$, the matrix of FIG. 6B is used to determine if those pixels should be joined. The abscissa $Q_i$ is equal to the distance 5 and the ordinate $Q_{i+1}$ is equal to the distance 1. The intersection of these values is seen to be equal to 0, thus indicating that the $Q_{II}$ pixel at (7, 13) should not be joined to the $Q_{III}$ pixel at (6, 10). But, the distance 5 is sufficiently close to join the pixel at (6, 11) with the pixel at (7, 13); and the pixel at (6, 12) is artificially filled to close the soft break.

The foregoing analysis of filled pixels continues, column-by-column, to detect soft breaks and to join pixels that are separated by a soft break. It will be appreciated that if two separated pixels nevertheless lie within the matrix of FIG. 6A, that is, if one pixel is disposed at the origin and the other is within the quadrant $Q_{II}$ or $Q_{III}$ and is spaced therefrom by the dimensionless number 7 or less, a soft break that should be closed is detected. If the distance between pixels is greater than 7, it is assumed that the end of an image block has been reached. The confines, or dimensions, of a block thus established, irrespective of the orientation of the image, and data representing each critical point and each link are supplied to path tracer and feature analyzer 20. As will be recognized, this permits italics to be interpreted because the limitation of segmentation based upon the sensed density of pixels in the horizontal and vertical directions, mentioned earlier in this specification, does not present a problem to detecting the end of one character and the beginning of another. The arbitrary beginning and end of each image block is sensed.

From the XY coordinates of adjacent pixels, a determination of the link-tag of each pixel is made. Relatively small changes in the Y coordinate as the X coordinate changes unit by unit, as in the pixels disposed in rows 1 and 2, generally represent the same link. Likewise, relatively small changes in the X coordinate as the Y coordinate changes unit by unit, as in the pixels disposed in columns 5 and 6, generally represent the same link. Also, a unit change in the X coordinate accompanied by a unit change in the Y coordinate, as in the pixels at (6, 20), (7, 19), (8, 18), (9, 17) and (10, 16), generally represent the same diagonal link. Hence, the link tags illustrated in FIG. 4 may be determined for each pixel.

Also, from the foregoing analysis and filling in of blank pixels, particular coordinates will be found which represent the end of one link and the beginning of another. Such "class 2" points are identified as well as the "class 3" points which, of course, are points at which three (or more) separate links are joined. By utilizing the look-ahead buffer described above and the analysis matrices shown in FIGS. 6A and 6B, the XY coordinate data of the respective points included in the scanned character, as well as tags representing the particular links joined by such points are identified and stored. Then, the analysis mentioned above in conjunction with FIG. 4 may be carried out.

It will be recognized that the matrix shown in FIG. 6A, when superimposed onto pixel data, separates that data into pixels that have already been examined, i.e. pixels which lie in quadrants $Q_I$ and $Q_{IV}$ (that is, these pixels will already have been scanned and analyzed by the time the origin is superimposed over the pixel in question), and pixels that have not yet been examined, i.e. pixels which lie in quadrants $Q_{II}$ and $Q_{III}$. The $Q_I$ and $Q_{IV}$ quadrants contain information of the "past" and the $Q_{II}$ and $Q_{III}$ quadrants contain information of the "future".

Figure 5A:
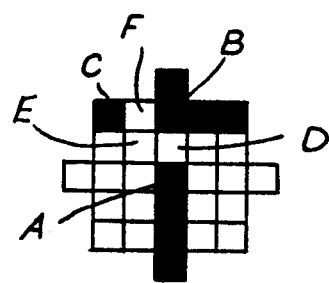
FIG. 5A and 5B are useful in understanding the manner in which soft breaks are filled.

The use of the matrix 6B, as mentioned above, may serve as a guide to determine if two unconnected pixels are separated by a soft break and should be joined. The examples shown in FIGS. 5A and 5B further explain this. In FIG. 5A, the pixels at locations A, B, C, D and F are superimposed onto the matrix of FIG. 6A. At the time that pixel B was analyzed, it was found that a soft break was present between pixel B and pixel A and a soft break also was present between pixel B and pixel C. Hence, pixels B and A will be joined by artificially filling pixel D, and pixels B and C likewise will be joined by artificially filling pixel F. The artificial filling of blank pixels is stored in the look-ahead buffer. Subsequently, when pixel A is examined, pixel C in quadrant $Q_{II}$ is sensed. A decision must be made whether to fill pixel E so as to join pixels A and C. This presents three possible connections: pixels ADB, pixels BFC and pixels AEC. The distances between pixels AB and between AC are found, from the matrix of FIG. 6A, to be AB=3 and AC=6. Pixel B is located in quadrant $Q_I$ and pixel C is located in quadrant $Q_{II}$. Turning to the matrix in FIG. 6B, AB=$Q_i$=3 and AC=$Q_{i+1}$=6. The intersection of $Q_i$ and $Q_{i+1}$ in the FIG. 6B matrix means BC=3. Since BC is less than AC, the pixels AEC are not connected. Pixel A is connected only to pixel B; it is not linked to pixel C.

Figure 5B:
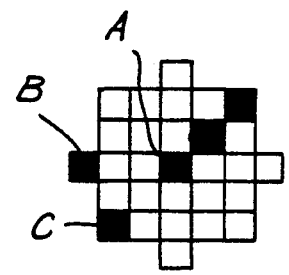

In the example of FIG. 5B, pixel A is analyzed. A soft break is assumed between pixels AC and pixels AB. The distance between pixels AB is 7 and the distance between pixels AC is 6. It would seem that pixel A should be connected both to pixel B and to pixel C; but subsequently when pixel C is analyzed, it might be concluded that pixel C also should be connected to pixel B. This possible future connection is examined now by referring to the matrix of FIG. 6B. Pixel B is located in quadrant $Q_{II}$ and pixel C is located in quadrant $Q_{III}$. Hence, AB=$Q_i$=7 and AC=$Q_{i+1}$=6. The intersection of $Q_i$ and $Q_{i+1}$ in the FIG. 6B matrix means that BC=5. Thus, when pixel C is analyzed, it will turn out that pixel C should be connected to pixel B. The examination of pixel A results in the connection of pixel A only to pixel C because the distance AC is less than the distance AB. Only the shortest distance from the pixel under examination is connected.

FIG. 7 is a diagrammatic representation of the decimal notations utilized to identify a lagoon (decimal notation "0") or a bay. Depending upon the direction in which the bay opens, a different decimal notation is used. Thus, a bay north is represented by the decimal notation "1", a bay northeast is represented by the decimal notation "2", a bay east is represented by the decimal notation "3", a bay southeast is represented by the decimal notation "4", a bay south is represented by the decimal notation "5", a bay southwest is represented by the decimal notation "6", a bay west is represented by the decimal notation "7" and a bay northwest is represented by the decimal notation "8". These decimal notations are utilized by the software for the purpose of comparing the geographical features sensed in a scanned character to the geographical features stored in dictionary 24 (FIG. 1, as described above).

It is appreciated that, in some instances, when a thick, non-uniformly printed character scanned by image pick-up device 10 is thinned by image thinning control 12, unexpected lagoons may be present. An example of this is shown in FIG. 8A wherein the expected "class 3" point that links the usual bay east with the lagoon of numeral "6" is replaced by a small lagoon (referred to as a "puddle") that is formed when the thick character is thinned about a "hole" that appears within the thick stroke. (The hole generally is larger than a single blank pixel.) Analysis of the character shown in FIG. 8A in accordance with the procedure discussed above will result in a character formed of one "class 1" point and three "class 3" points; and by tracing the paths formed of the critical points of this character, the resultant geographical features will appear as a bay east above a lagoon, this combination being next to another lagoon. Such geographical features are not found in any character included in the set formed of one "class 1" and three "class 3" points.

Additionally, FIG. 8A illustrates an upstanding link which might be formed due to a blot in the printed character. This upstanding link is defined herein as a "whisker"; and its presence also might lead to an inability to identify correctly the sensed image.

In accordance with the present invention, small lagoons, or puddles, and whiskers are detected and eliminated from the scanned image by the smoother included in path tracer and feature analyzer 20. In particular, a whisker is defined as a link formed of no more than three pixels. Such a small link normally is not expected in a valid or legitimate character. Thus, the whisker extending upward from the image shown in FIG. 8A is ignored; and all data relating thereto is deleted.

Likewise, a puddle is identified as a lagoon whose extreme dimensions, that is, whose width and height ($\Delta x_{max}$ and $\Delta y_{max}$) are less than predetermined amounts. A lagoon of this small size is construed as a puddle; and all data relating thereto is ignored, eliminated or deleted.

It will be recalled that the smoother also functions to eliminate beaches from the scanned, thinned image. As mentioned above, small concavities are recognized as beaches if the size of the concavity is less than a predetermined amount, such as less than 1/16 of the overall size of the image "block", and also as a function of its orientation with respect to preceding and following concavities and convexities whose sizes relative to the image block also are examined. Hence, links may be "straightened".

FIG. 8B represents the character "6" after removal of the whisker and puddle therefrom. The image shown in FIG. 8B then is analyzed in the manner described above in conjunction with FIG. 4. It should be noted that, for convenience, points which are identified with triangles, squares and circles are "class 1", "class 2" and "class 3" points, respectively. It will be appreciated that, when the analysis described above in conjunction with FIG. 4 is applied to the image shown in FIG. 8B, this image is properly identified as the numeral "6".

The purpose of and advantages derived from rearranger 28 now will be described in conjunction with FIGS. 9A and 9B. Let it be assumed that the document presented to image pick-up device 10 is an envelope. FIG. 9A represents the line-by-line address as follows:

Comm. of Patents

Washington, D.C.

20231

In the preferred embodiment, a column of image sensors is long enough to scan these three lines concurrently. Scanning in the top-to-bottom and right-to-left directions, each of the scanned characters will be identified, in accordance with the procedure discussed above, such that first the final "s" in patents is identified, followed by the period ("."), followed by the numeral "1" in the zip code, followed by the "t" in patents, followed by the "C", followed by the numeral "3" and so on. The resultant recognized characters appear as shown in FIG. 9B. Periods and commas are recognized as small data blocks located in the vicinity of the bottom edges of the other alphanumeric characters.

Although the recognized characters shown in FIG. 9B are read out in a right-to-left manner, characters of one line are interspersed with characters of other lines. One feature of the present invention rearranges the read out, or recognized characters in their proper lines.

It is recalled that, in addition to tracing the path of each image and analyzing its geographical features, the XY coordinate of the center of gravity of the image (o data) block also is obtained. Thus, and with reference to the characters shown in FIG. 9B, the center of gravity of the letter "s" will correspond to a higher line than the center of gravity of period (".") which, in turn, is higher than the center of gravity of the character "1". Likewise, the center of gravity of the character "t" will correspond to a higher line than the center of gravity of the character "C" which, in turn, is greater than the center of gravity of the character "3". By selecting the characters illustrated in FIG. 9B in accordance with their respective centers of gravity, the original characters shown in FIG. 9A may be rearranged in proper line-by-line fashion. Of course, recognizing that the rearranged characters will appear in right-to-left arrangement, the mirror image of that arrangement may be obtained easily by selecting the order of these characters as a function of, for example, the average X coordinate of each.

It may turn out that the characters provided by rearranger 28 contain what has been referred to above as "hard breaks". It is recalled that a "soft break" is formed of two filled pixels which are separated by a distance no greater than the dimensionless numeral 7 when the matrix shown in FIG. 6A is superimposed over those pixels. A hard break is formed when the two filled pixels are separated by a greater distance. It also is recalled that, when a pixel closest to a pixel under examination is outside the "neighborhood" established by the matrix shown in FIG. 6A, that is, when the closest pixel is spaced from the pixel under examination by a distance greater than the dimensionless number 7, the end of a "block" containing image data is identified. A hard break thus is present when the dimension of a block of image data, that is, its overall height and width as determined by the XY coordinates of the pixels included in that image block, is less than the overall size of image blocks containing recognized characters. The separation of such a small, out of range block and adjacent blocks, which may or may not be small, out of range blocks themselves, then is detected. Initially, it is assumed that the out of range block under consideration should be joined to the block closest thereto, whether or not that closest block is of "normal" size or itself is a small data block. If, by joining these two blocks, the resultant image block is an oversized out of range block, it is assumed that the joinder is improper. Accordingly, the small out of range block then is attempted to be joined to the next closest block; and the foregoing examination of the overall size of the joined blocks is repeated. This process continues until the out of range block is joined with another block; and the resultant image block is not itself out of range. The data included in this resultant block then is supplied by character reconstructor 29 to path tracer and feature analyzer 20 for the analysis that has been described in detail hereinabove. As a result, the hard break in an image is closed; the critical points and geographical features of that image are determined; and the image is identified as a known character as a function of those geographical features.

FIGS. 10A-10D represent the manner in which character reconstructor 29 functions to detect and join a hard break in a scanned image. FIG. 10A represents the original image, including the hard break, supplied to image thinning control 12 by image pick-up device 10. FIG. 10B illustrates the thinned image which, of course, contains the hard break. The thinned image is scanned by link identifier 14 and link connector 16, resulting in the formation of two separate image blocks, one image block being constituted by the broken segment shown in the lower right portion of FIG. 10B (which is isolated in FIG. 10C), and the other image block being formed of the remainder of this image. Based upon the XY coordinates of the pixels which constitute the larger image, the link identifier 14 assumes that this larger image is included in a block of "normal" size. However, the smaller, broken segment is recognized as being included in a small image block whose size is out of range.

Each image block is analyzed separately by path tracer and feature analyzer 20, and it is assumed that the geographical features which are detected in each block do not compare favorably with the geographical features stored in dictionary 24. Comparator 22 thus does not recognize either the "normal" size image or the out of range image.

Following the operation of character separator 26 and rearranger 28, character reconstructor 29 is supplied with the data blocks representing the "normal" size image and the out of range image. Although the remaining characters which presumably precede and follow the broken image shown in FIG. 10B are not illustrated, it will be appreciated that character separator 26 and rearranger 28 operate to place these characters in proper horizontal and vertical position. Based on the positions of those recognized characters, it will be appreciated that the broken segment included in the out of range data block is closer to the "normal" size data block shown in FIG. 10B than it is to the other, recognized characters. Consequently, character reconstructor 29 joins the out of range data block to the "normal" size data by inserting a joint therebetween. This joint is illustrated in FIG. 10D.

Thereafter, the joined segment and remaining portion of the scanned image is supplied by the character reconstructor to path tracer and feature analyzer 20, wherein the resultant image is analyzed in the manner discussed above.

Hence, although the hard broken image might not be identified; the broken segment is joined to the remainder of the image; and the joined image then is readily recognized as the character "C".

It should now be appreciated that the use of geographical feature detection to recognize alphanumeric characters, the principle upon which the present invention proceeds, permits character recognition with substantial font insensitivity. This is because the same letter exhibits the same basic geographical features irrespective of its font. Although the overall geographical features which comprise that letter will vary as a function of the serifs and other embellishments that may be used in the printing of that character, it will, nevertheless, contain the same basic geographical features which characterize that letter. If these basic geographical features are not detected, the character will not be recognized; and this is primarily attributed to the fact that the scanned image is, in actuality, not a recognizable character.

Figure 11D:

Examples of the letter "A" which may be printed in different fonts and which may be printed with various serifs and embellishments are illustrated in FIGS. 11A-11D. FIG. 11A represents different fonts which, when analyzed by link identifier 14, path tracer and feature analyzer 20 and comparator 22, will be found to have the following basic geographical feature which characterizes this letter: a lagoon above a bay south. Each of the examples illustrated in FIG. 11A is formed of only this arrangement of geographical features, notwithstanding the different fonts or stylized versions illustrated therein.

When, for example, two serifs are added to the legs of the letter "A", such as shown in FIG. 11B, additional geographical features are added to the image. Also, two additional "class 3" and two additional "class 1" points are added. A geofeature analysis of the image shown in FIG. 11B results in the geographical features of a bay northeast next to the combination of a lagoon above a bay south which, in turn, is next to a bay northwest. While the bay northeast and bay northwest are due to the added serifs, it is seen that the basic geographical features of a lagoon above a bay south nevertheless are retained. Of course, the presence of these basic geographical features will permit the recognition of the image shown in FIG. 11B as the letter "A", even with the embellishment provided by the added serifs.

FIG. 11C illustrates examples of still further embellishments and serifs; and FIG. 11D illustrates yet another example of an extremely stylized version of the letter "A". An analysis of the geographical features of this highly stylized version results in the detection of a bay east next to the combination of a lagoon above a bay south which, in turn, is next to the combination of a bay northwest above a bay west. Notwithstanding the additional geographical features attributed to the serifs and embellishments shown in FIG. 11D, the basic geographical feature of a lagoon above a bay south which is inherent in the letter "A" is observed. The images shown in FIGS. 11A-11D will not be properly identified if these basic geographical features are not present.

Thus, in spite of serifs and embellishments to a basic alphanumeric character, the present invention is font insensitive because all such versions of a basic character can be detected in view of the fact that each such version nevertheless includes a basic arrangement of geographical features that characterize the character.

Figure 12:
FIG. 12 is useful in understanding how the present invention effectively separates characters that may be interleaved, thus effecting good segmentation not attainable by known OCR systems.

The advantages achieved by the ability of the present invention to "segment" characters by detecting the beginning and end of each image block as a function of the proximity of adjacent pixels to the last pixel detected in an image is represented in FIG. 12. It is recalled that the end of an image block, that is, the XY coordinate of the last pixel included in that image, is determined by sensing whether a filled pixel is present in the "neighborhood" defined by the matrix shown in FIG. 6A when a pixel under examination is placed at the origin of this matrix. If no filled pixel is found within this "neighborhood", it is assumed that the end of an image block has been reached. Hence, proper segmentation of scanned images is achieved even though a pixel of one image block is disposed in the very same column as the pixel in another image block. In FIG. 12, it is seen that the letter "L" and the numeral "9" overlap; that is, pixels included within the numeral "9" are disposed in the same column as a pixel included in the letter "L". Likewise, it is seen that the numerals "9" and "2" overlap. Nevertheless, the confines of an image block are established as a function of sensing whether a pixel is within the "neighborhood" of another pixel included in the same image.

Likewise, overlap of the letters "A" and "W" do not prevent the proper segmentation of these two letters. Similarly, the fact that a portion of the numeral "9" exhibits horizontal overlap with a portion of the letter "W", does not prevent proper segmentation of these characters. Furthermore, in view of the aforedescribed operation of rearranger 28, it is determined that the numeral "9" should be disposed on the upper line of characters shown in FIG. 12, and not the lower line. That is, the center of gravity of the image block containing the numeral "9" is determined to be closer to the center of gravity of the characters included in the upper line of FIG. 12 than to the center of gravity of the characters included in the lower line.

Figure 13A:
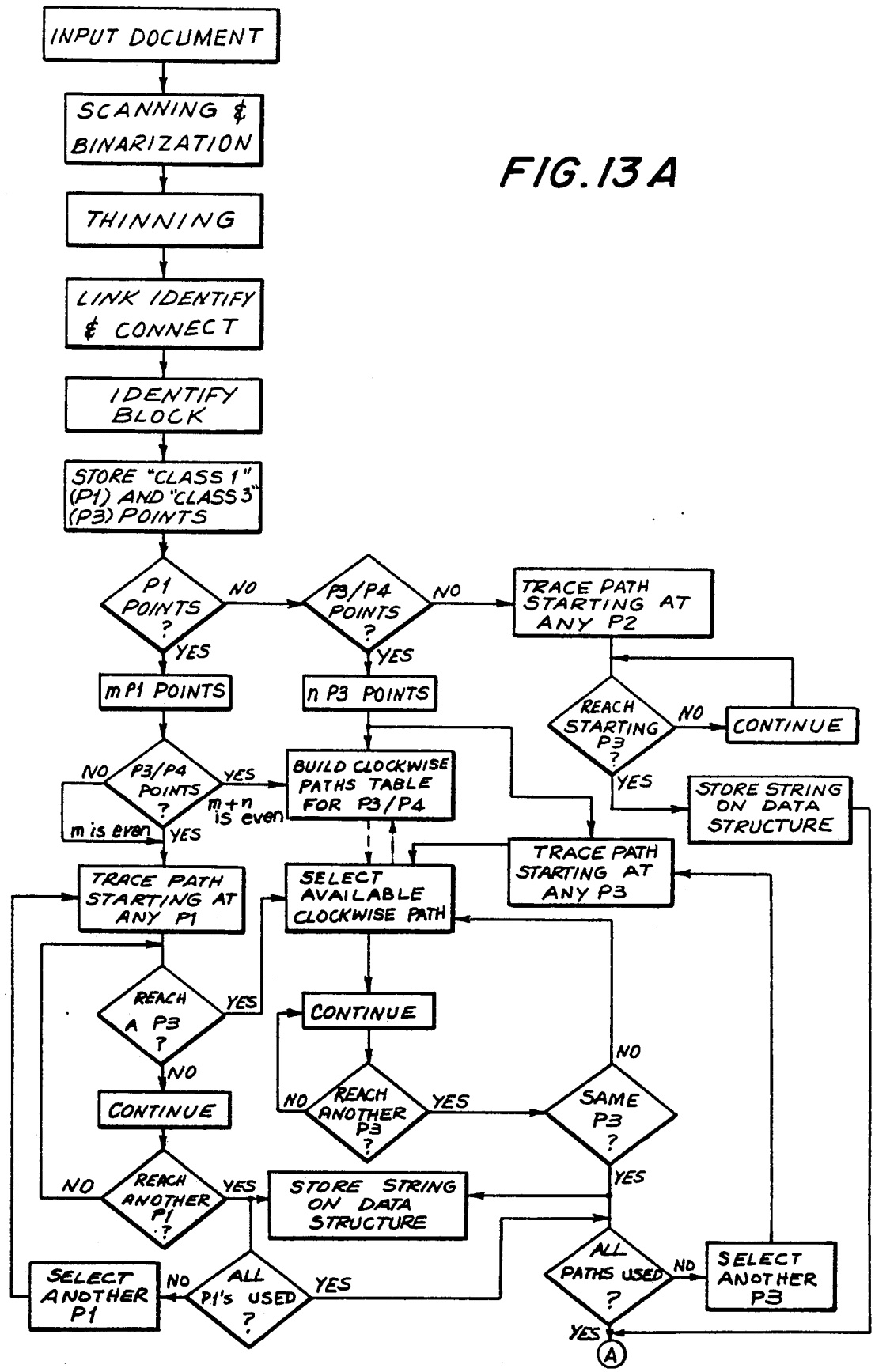
FIGS. 13A and 13B and 13C are flow charts which represent the manner in which a suitably programmed minicomputer operates to carry out this invention.
Figure 13B:
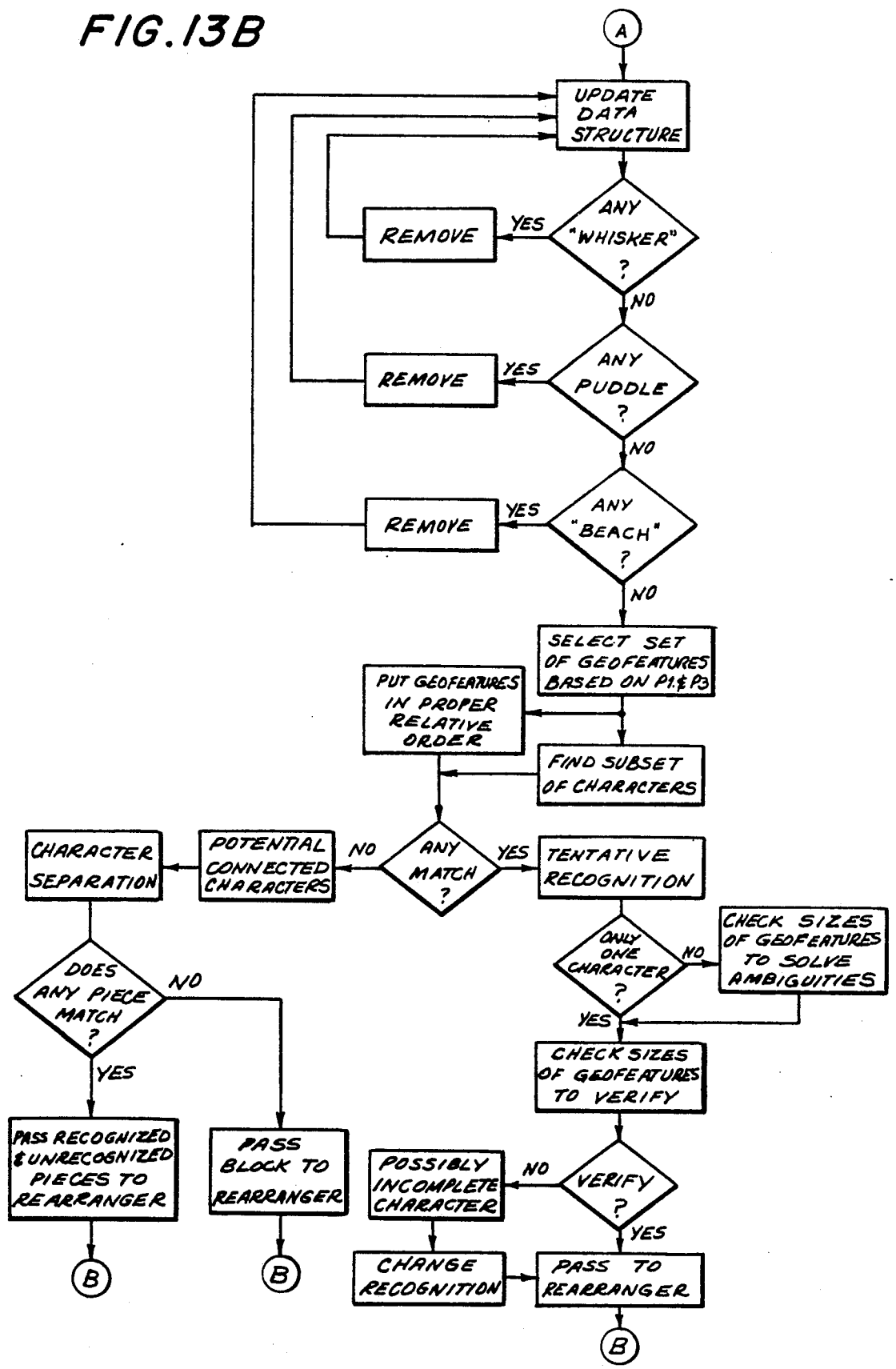
Figure 13C:
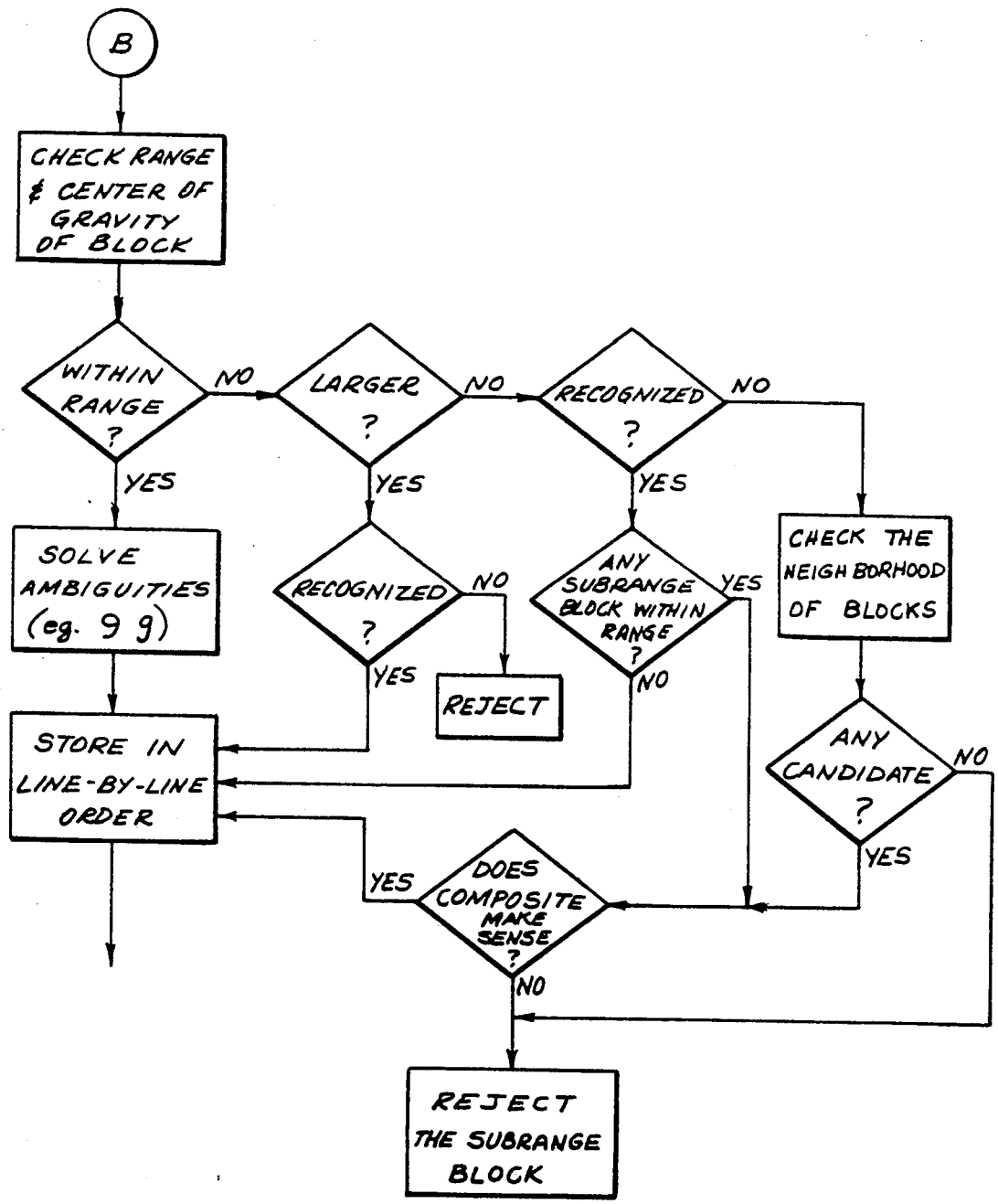

It is preferred that the present invention be implemented by a combination of hardware and software. An appropriate mini-computer, such as the VAX or micoVAX, manufactured by Digital Equipment Corp., may be programmed to carry out the function of the blocks illustrated in FIG. 1 and described in detail above. An example of such software is set out in the flow charts of FIGS. 13A through 13C; and one of ordinary skill in the programming art as well as in the optical character recognition art would be readily enabled thereby to program a suitable micro- or mini-computer to carry out the functions described herein.

While the present invention has been particularly shown and described with reference to a preferred embodiment, it will be readily appreciated by those of ordinary skill in the art that various changes and modifications may be made. Some of the changes and modification have been mentioned heretofore. Furthermore, the characters stored in the respective sets illustrated in FIG. 2, that is, the geographical features associated with the characters in each such set as stored in dictionary 24, may be enlarged or reduced, as desired. By reason of the geographical features which are analyzed and identified, it is appreciated that the present invention is not limited solely to a particular one or selected few fonts. Indeed, the present invention can function, generally successfully, to recognize handprinted characters.

It is intended that the appended claims be interpreted as including the preferred embodiment described herein as well equivalents thereto.

What is claimed is:

1. A method of recognizing alphanumeric characters, comprising the steps of:
   scanning a plurality of characters, which may not be disposed in uniform lines and which may overlap, to form image blocks of pixel data derived from and representative of each scanned character;
   thinning the pixel data included in each said image block to reduce the thickness of the pixel data representing the scanned characters;
   sensing the proximity of spaced apart pixel data to determine the beginning and ending of image blocks of thinned pixel data;
   detecting the occurrence of predetermined geographical features in an image block of thinned pixel data;
   comparing the detected geographical features to a store of known alphanumeric characters in which each known character is identified by particular geographical features included therein; and
   identifying a scanned character as the alphanumeric character having geographical features to which said detected geographical features favorably compare.

2. The method of claim 1 wherein said step of detecting the occurrence of predetermined geographical features includes sensing the positions of said detected geographical features with respect to each other.

3. The method of claim 2 wherein said geographical features comprise bays and lagoons.

4. The method of claim 3 wherein a lagoon is an enclosed area and a bay is an open area.

5. The method of claim 4 wherein a bay is characterized by the direction to which it opens.

6. The method of claim 5 wherein said known characters are identified by the lagoons and types of bays from which said characters are formed, and the relative positioning of said lagoons and bays with respect to each other.

7. The method of claim 1 wherein said step of detecting the occurrence of predetermined geographical features includes sensing a break in the scanned character; and completing said break.

8. The method of claim 7 wherein said break comprises a "soft" break formed by at least two links of the scanned character which are separated from each other by less than a predetermined amount, and said break is completed by joining links in closest proximity.

9. The method of claim 7 wherein said break comprises a "hard" break formed by at least two portions of the scanned character which are separated from each other by more than a predetermined amount, and said break is completed by joining portions in closest proxamity.

10. The method of claim 1 wherein said step of detecting the occurrence of predetermined geographical features includes sensing a connection between two characters; and disregarding the sensed connection in detecting said geographical features.

11. The method of claim 10 wherein said step of sensing a connection comprises determining when none of the stored combination of geographical features which identify known characters corresponds to the arrangement of detected geographical features.

12. The method of claim 11 wherein said step of disregarding the sensed connection comprises ascertaining which portion of the arrangement of detected geographical features corresponds to a stored combination of geographical features; and disregarding that portion of said arrangement of detected geographical features whose position is sensed after the ascertained portion.

13. A method of recognizing alphanumeric characters formed of one or more intermediate links, comprising the steps of:
scanning a plurality of characters, which may not be disposed in uniform lines and which may overlap, to form image blocks of pixel data derived from and representative of each scanned character;
thinning the pixel data included in each said image block to reduce the thickness of the pixel data representing the scanned characters;
sensing the proximity of spaced apart pixel data to determine the beginning and ending of image blocks of thinned pixel data;
detecting the number of "class 1" and "class 3" points included in an image block of thinned pixel data, wherein a "class 1" point is defined as a free end of a link, a "class 3" point is defined as a point formed by the juncture of three links, a "class 4" point is defined as a point formed by the intersection of four links, and each "class 4" point is detected as two "class 3" points;
selecting as a function of the detected number of "class 1" and "class 3" points a group of characters in which the image block of thinned pixel data is included;
sensing predetermined geographical features of the image block of thinned pixel data; and
identifying a scanned character as a particular character in said selected group in accordance with the sensed geographical features.

14. The method of claim 13 wherein said step of scanning comprises generating pixel data representing the scanned character; identifying coordinates of said pixel data; and storing said coordinates.

15. The method of claim 14, further comprising the steps of identifying a link between at least two pixels, sensing the coordinate of the pixel which comprises an end point of an identified link or a beginning point of another link, storing the coordinates of each sensed end and beginning point, determining the number of links connected to each said sensed end and beginning point, and identifying the class of each said sensed end and beginning point as a function of the number of links connected thereto.

16. The method of claim 15 wherein said step of sensing predetermined geographical features comprises detecting the presence of a bay extending between the coordinates of two "class 1" points, detecting the presence of a lagoon formed by a "class 3" point, and determining the relative positions of the detected bays and lagoons as a function of the coordinates of which each is comprised.

17. The method of claim 16 wherein said step of detecting the presence of a bay comprises tracing a path from a selected "class 1" point and thence from link to connected link, in a predetermined direction, until arriving at another "class 1" point; sensing changes in the coordinates of the end point of a link relative to the coordinates of the beginning point of that link; and detecting the presence and orientation of a bay as a function of the sensed changes in the coordinates.

18. The method of claim 17 wherein said predetermined direction comprises the counterclockwise direction in tracing said path.

19. The method of claim 17 further comprising the steps of identifying each link connected to a "class 3" point, and arranging the identities of the links connected to said "class 3" point in a predetermined order; and wherein said step of tracing a path from link to link includes the step of arriving at a "class 3" point via one of said identified links, and leaving said "class 3" point via the identified link that next follows said one identified link in said arranged, predetermined order.

20. The method of claim 19 wherein said predetermined order is clockwise.

21. The method of claim 19 wherein said step of detecting the presence of a lagoon comprises tracing a path from a "class 3" point, said path including a link extending from said "class 3" point, which link had not been included in a previously traced path, and returning to said "class 3" point as said path is traced.

22. The method of claim 21 further comprising the steps of sensing if each link connected to each "class 3" point has been included in the traced paths; and concluding that all bays and all lagoons included in the scanned character have been detected if all links connected to all "class 3" points have been included in the traced paths.

23. The method of claim 15 further comprising the steps of detecting a separation between "filled" pixels as said character is scanned; determining that said separation should be filled in; and identifying the link in which said separation should be included.

24. The method of claim 23 wherein said step of determining that said separation should be filled in comprises detecting the relative distances between filled in pixels which form said separation; and sensing the shorter of the distances.

25. The method of claim 24 wherein said step of identifying the link comprises sensing the identity of the link which includes a filled in pixel having the smallest separation from a next closer filled in pixel; and identifying said separation as being included in said last-mentioned link.

26. The method of claim 23, wherein said step of scanning further comprises sensing successive columns of sequential pixels; and wherein said step of identifying said separation as being included in a link comprises changing the identity of the link in which said separation should be included if, when a successive column of pixels is sensed, the identified separation is detected as being included in a pattern of pixels which comprise a link of different identity.

27. The method of claim 26 further comprising the steps of determining that said separation should not be filled in and not including that separation in any identified link.

28. The method of claim 13 wherein the step of sensing the proximity of spaced apart pixel data comprises detecting the absence of filled in pixels within a predetermined neighborhood of a sensed filled pixel.

29. The method of claim 28 further comprising the steps of sensing the size of each block of thinned pixel data as a function of the coordinates of the pixels therein; and detecting the occurrence of an out of range block whose size differs substantially from the sizes of previously sensed blocks.

30. The method of claim 29 further comprising the step of joining an undersize block of thinned pixel data to an adjacent block to form a joined block of thinned pixel data representing a scanned character; and identifying the scanned character represented by the joined block of thinned pixel data in accordance with the geographical features of said joined block.

31. The method of claim 16 further comprising the steps of detecting at least one undesired link between two independent characters; ignoring said undesired link; and identifying said two independent characters.

32. The method of claim 31 wherein said step of detecting at least one undesired link comprises detecting bays and lagoons of the scanned characters that do not correspond to bays and lagoons of a known character; sensing bays and lagoons of a portion of the scanned characters that do correspond to bays and lagoons of a known character; ignoring links which extend from said portion; detecting bays and lagoons in the remainder of the scanned characters that follow the ignored link; and identifying the characters which precede and which follow said ignored link as a function of the detected bays and lagoons.

33. The method of claim 15 further comprising the steps of detecting artifacts in a block of thinned pixel data; and deleting said artifacts prior to identifying that scanned character.

34. The method of claim 33 wherein said artifacts include a "whisker" formed of a link comprising less than a predetermined number of pixels.

35. The method of claim 33 wherein said artifacts include a "puddle" formed of a lagoon of less than a predetermined size.

36. The method of claim 33 wherein said artifacts include a "beach" formed of links interconnected in relatively small changes of direction from one link to another.

37. A method of recognizing alphanumeric characters, comprising the steps of:
scanning plural lines of characters with optical pick-up means that may pick-up characters disposed in different lines;
generating image blocks of pixel data representing the picked up characters, each pixel being located by X, Y positional coordinates;
thinning the pixel data included in each said image block to reduce the thickness of the pixel data representing the scanned characters;
sensing the proximity of spaced apart pixel data to determine the beginning and ending of image blocks of thinned pixel data;
sensing predetermined geographical features of each image block of thinned pixel data;
identifying a scanned character as a particular character in accordance with the sensed geographical features; and
arranging the identified characters in the same lines in which the scanned characters were disposed notwithstanding the order of the characters represented by said pixels.

38. The method of claim 37 wherein said step of arranging comprises determining the average X, Y coordinates of the pixels which represent the range of each respective picked up character; and arranging in a single line those identified characters having approximately the same average Y coordinate.

39. The method of claim 38 wherein said step of arranging further comprises the step of arranging said identified characters in a single line in left-to-right order in accordance with the average X coordinate of each said character.

40. A method of detecting a bay in a binarized representation of an optically scanned alphanumeric character, said binarized representation comprising discrete pixel elements, comprising the steps of:
identifying points which are present at the beginning and at the ends of links which comprise said alphanumeric character;
tracing a path formed of linked points;
sensing whether a change in direction of a traced path represents a relative concavity or convexity by superimposing a graphical x-axis on a portion of the traced path with a point of said path positioned at the origin of said x-axis, and detecting into which quadrant said path which continues from said point extends; and
detecting a bay formed by said traced path if a relative concavity is sensed.

41. The method of claim 40 wherein a relative concavity is sensed if said path which continues from said point extends into the first or second quadrant.

42. An optical character recognition system, comprising:
scanning means for scanning a plurality of characters, which may not be disposed in uniform lines and which may overlap, to form image blocks of pixel data derived from and representative of each scanned character;
means for thinning the pixel data included in each said image block to reduce the thickness of the pixel data representing the scanned characters;
means for sensing the proximity of spaced apart pixel data to determine the beginning and ending of image blocks of thinned pixel data;
detection means for detecting the occurrence of predetermined geographical features in an image block of thinned pixel data;
storage means for storing particular geographical features of known alphanumeric characters; and
comparison means for comparing the detected geographical features to the stored geographical features to identify a scanned character as the alphanumeric character whose geographical features correspond to said detected geographical features.

43. The system of claim 42 wherein said geographical features comprise bays having open areas and lagoons having closed areas; wherein said detection means includes means for determining the relative positioning of said lagoons and bays with respect to each other; and wherein said comparison means compares said relatively positioned bays and lagoons to stored bay and lagoon data.

44. An optical character recognition system, comprising:
scanning means for scanning a plurality of characters, which may not be disposed in uniform lines and which may overlap, to form image blocks of pixel data derived from and representative of each scanned character;
means for thinning the pixel data included in each said image block to reduce the thickness of the pixel data representing the scanned characters;
means for sensing the proximity of spaced apart pixel data to determine the beginning and ending of image blocks of thinned pixel data;

detection means for detecting the number of "class 1" and "class 3" points included in a block of thinned pixel data, wherein a "class 1" point is defined as a free end of a link included in said block, a "class 3" point is defined as a point formed by the juncture of three links, a "class 4" point is defined as a point formed by the intersection of four links, and each "class 4" point is detected as two "class 3" points;

selection means for selecting as a function of the detected number of "class 1" and "class 3" points a set of characters in which a scanned character is included;

feature sensing means for sensing predetermined geographical features of a block of thinned pixel data;

storage means for storing geographical features of sets of known characters; and comparison means for comparing the sensed geographical features to the stored geographical features in the selected set to identify a scanned character as a particular character in said selected set in accordance with the compared geographical features.

45. The system of claim 44 wherein said geographical features comprise bays and lagoons; and wherein said feature sensing means comprises means for detecting the presence of a bay extending from the coordinates of at least one "class 1" point, means for detecting the presence of a lagoon formed from a "class 3" point, and means for determining the relative positions of the detected bays and lagoons as a function of the coordinates of which each is comprised.

46. The system of claim 45 wherein said feature sensing means further includes means for identifying each link connected to a "class 3" point, and means for arranging the identities of the links connected to said "class 3" point in a predetermined order; and wherein said means for detecting the presence of a bay includes means for tracing a path from link to link by arriving at a "class 3" point via one of said identified links, and leaving said "class 3" point via the identified link that next follows said one identified link in said arranged, predetermined order.

47. The system of claim 46 wherein said means for detecting the presence of a lagoon comprises means for tracing a path from a "class 3" point via a link which had not been included in a previously traced path and returning to said "class 3" point as said path is traced.

48. The system of claim 44 wherein said feature sensing means further comprises means for detecting at least one undesired link between two independent characters, and means for ignoring said undesired link, thereby resulting in two independent characters.

49. The system of claim 44 wherein said detection means comprises means for sensing a "soft break" in a link, and means for filling in said "soft break".

50. The system of claim 49 wherein said means for sensing a "soft break" comprises means for sensing a separation between a "class 1" point and a link that is less than a predetermined distance; and said means for filling in said "soft break" comprises joining said "class 1" point to a link that is closest thereto.

51. The system of claim 44 further comprising means for sensing a "hard break" in the scanned character; and means for filling in said "hard break".

52. The system of claim 51 wherein said means for sensing a "hard break" comprises means for detecting blocks in which portions of the scanned character that are separated by said "hard break" are respectively contained; and means for determining a block of relatively small size.

53. The system of claim 52 wherein said means for filling in said "hard break" comprises means for joining a block of relatively small size to a block adjacent thereto to form a joined block which contains the scanned character.

54. The system of claim 44 wherein said feature sensing means includes smoothing means for detecting and removing artifacts in a block of thinned pixel data.

55. The system of claim 54 wherein said artifacts include one or more of "whiskers", "puddles" and "beaches".

56. An optical character recognition system comprising:

scanning means for scanning plural lines of characters, including optical pick-up means that may pick-up characters disposed in different lines;

pixel generating means for generating image blocks of pixel data representing the picked up characters, each pixel being located by X, Y positional coordinates;

means for thinning the pixel data included in each said image block to reduce the thickness of the pixel data representing the scanned characters;

means for sensing the proximity of spaced apart pixel data to determine the beginning and ending of image blocks of thinned pixel data;

sensing means for sensing predetermined geographical features of each image block of thinned pixel data;

identifying means for identifying a scanned character as a particular character in accordance with the sensed geographical features; and re-arranging means for arranging the identified characters in the same lines in which the scanned characters were disposed notwithstanding the order of the characters represented by said pixels.

* * * * *